United States Patent
Bradley et al.

(10) Patent No.: US 12,482,076 B2
(45) Date of Patent: Nov. 25, 2025

(54) TECHNIQUES FOR ENHANCING SKIN RENDERS USING NEURAL NETWORK PROJECTION FOR RENDERING COMPLETION

(71) Applicants: DISNEY ENTERPRISES, INC., Burbank, CA (US); ETH Zürich (Eidgenössische Technische Hochschule Zürich), Zürich (CH)

(72) Inventors: Derek Edward Bradley, Zurich (CH); Prashanth Chandran, Zurich (CH); Paulo Fabiano Urnau Gotardo, Zurich (CH); Jeremy Riviere, Zurich (CH); Sebastian Valentin Winberg, Zurich (CH); Gaspard Zoss, Zurich (CH)

(73) Assignees: Disney Enterprises, INC., Burbank, CA (US); ETH Zürich (Eidgenössische Technische Hochschule Zürich), Zürich (CH)

( * ) Notice: Subject to any disclaimer, the term of this patent is extended or adjusted under 35 U.S.C. 154(b) by 561 days.

(21) Appl. No.: 17/536,777

(22) Filed: Nov. 29, 2021

(65) Prior Publication Data

US 2022/0237751 A1     Jul. 28, 2022

Related U.S. Application Data

(60) Provisional application No. 63/142,957, filed on Jan. 28, 2021.

(51) Int. Cl.
    *G06N 3/045*     (2023.01)
    *G06N 3/047*     (2023.01)
    (Continued)

(52) U.S. Cl.
    CPC .............. *G06T 5/77* (2024.01); *G06N 3/08* (2013.01); *G06T 15/503* (2013.01);
    (Continued)

(58) Field of Classification Search
    CPC ............ G06T 5/77; G06T 15/503; G06T 2207/30201; G06T 5/60; G06T 11/00;
    (Continued)

(56) References Cited

U.S. PATENT DOCUMENTS 11,640,684 B2 *   5/2023   Abdal ................ G06N 3/045
                                                    382/156
2020/0042769 A1    2/2020   Yan et al.

FOREIGN PATENT DOCUMENTS

CN        112150393 A     12/2020
EP        3 929 876 A1     12/2021
WO   WO-2021034463 A1 *   2/2021   ......... G06K 9/00268

OTHER PUBLICATIONS

Ya-Liang Chang, VORNet: Spatio-temporally Consistent Video Inpainting for Object Removal, arXiv:1904.06726v1 [cs.CV] Apr. 14, 2019 (Year: 2019).*

(Continued)

*Primary Examiner* — Vu Le
*Assistant Examiner* — Lei Zhao
(74) *Attorney, Agent, or Firm* — Squire Patton Boggs LLP; Sarah Mirza

(57) ABSTRACT

Techniques are disclosed for generating photorealistic images of head portraits. A rendering application renders a set of images that include the skin of a face and corresponding masks indicating pixels associated with the skin in the images. An inpainting application performs a neural projection technique to optimize a set of parameters that, when input into a generator model, produces a set of projection images, each of which includes a head portrait in which (1) skin regions resemble the skin regions of the face in a corresponding rendered image; and (2) non-skin regions match the non-skin regions in the other projection images when the rendered set of images are standalone images, or transition smoothly between consecutive projection images (Continued)

in the case when the rendered set of images are frames of a video. The rendered images can then be blended with corresponding projection images to generate composite images that are photorealistic.

20 Claims, 12 Drawing Sheets
(9 of 12 Drawing Sheet(s) Filed in Color)

(51) Int. Cl.
  *G06N 3/048*     (2023.01)
  *G06N 3/08*      (2023.01)
  *G06T 5/60*      (2024.01)
  *G06T 5/77*      (2024.01)
  *G06T 7/11*      (2017.01)
  *G06T 11/00*     (2006.01)
  *G06T 11/60*     (2006.01)
  *G06T 13/40*     (2011.01)
  *G06T 15/00*     (2011.01)
  *G06T 15/50*     (2011.01)
  *G06V 10/82*     (2022.01)
  *G06V 40/16*     (2022.01)

(52) U.S. Cl.
  CPC .......... *G06V 40/165* (2022.01); *G06V 40/171* (2022.01); *G06T 2207/30201* (2013.01)

(58) Field of Classification Search
  CPC . G06T 2207/20081; G06T 2207/20084; G06T 15/00; G06T 7/11; G06T 11/60; G06T 13/40; G06N 3/08; G06N 3/045; G06N 3/048; G06N 3/047; G06V 40/165; G06V 40/171; G06V 10/82
  See application file for complete search history.

(56) References Cited

OTHER PUBLICATIONS

Chou, Face-off: automatic alteration of facial features, Multimed Tools Appl (2012) 56:569-596 (Year: 2012).*
Abdal et al., "Image2StyleGAN: How to Embed Images Into the StyleGAN Latent Space?", ICCV, IEEE, 2019, pp. 4432-4441.
Abdal et al., "Image2StyleGAN++: How to Edit the Embedded Images?", CPVR, IEEE, 2020, pp. 8296-8305.
Abdal et al., "StyleFlow: Attribute-conditioned Exploration of StyleGAN-Generated Images using Conditional Continuous Normalizing Flows", ACM Transactions on Graphics, https://doi.org/10.1145/3447648, vol. 40, No. 3, 2021, Article 21, Apr. 2021, pp. 21:1-21:21.
Alaluf et al., "ReStyle: A Residual-Based StyleGAN Encoder via Iterative Refinement", ICCV, 2021, pp. 6711-6720.
Aliev et al., "Neural Point-Based Graphics", arXiv:1906.08240, Apr. 5, 2020, 16 pages.
Beeler et al., "High-Quality Single-Shot Capture of Facial Geometry", ACM Transactions on Graphics, https://doi.org/10.1145/1833349.1778777, vol. 29, No. 4, Article 40, Jul. 2010, pp. 40:1-40:9.
Beeler et al., "Coupled 3D Reconstruction of Sparse Facial Hair and Skin", ACM Transactions on Graphics, https://doi.org/10.1145/2185520.2185613, vol. 31, No. 4, Article 117, Jul. 2012, pp. 117:1-117:10.
Beeler et al., "High-Quality Passive Facial Performance Capture using Anchor Frames", ACM Transactions on Graphics, https://doi.org/10.1145/1964921.1964970, vol. 30, No. 4, Article 75, Jul. 2011, pp. 75:1-75:10.
Bérard et al., "Lightweight Eye Capture Using a Parametric Model", ACM Trans. Graph., http://doi.acm.org/10.1145/2897824.2925962, vol. 35, No. 4, Article 117, Jul. 2016, pp. 117:1-117:12.
Bérard et al., "High-Quality Capture of Eyes", ACM Trans. Graph, vol. 33, 2014, 12 pages.
Bradley et al., "High Resolution Passive Facial Performance Capture", ACM Trans. Graph, vol. 29, No. 4, 2010, 10 pages.
Chan et al., "pi-GAN: Periodic Implicit Generative Adversarial Networks for 3D-Aware Image Synthesis", CVPR, 2021, pp. 5799-5809.
Chandran et al., "Semantic Deep Face Models", 2020 International Conference on 3D Vision, DOI:10.1109/3DV50981.2020.00044, 2020, pp. 345-354.
Choi et al., "StarGAN: Unified Generative Adversarial Networks for Multi-Domain Image-to-Image Translation", CVPR, IEEE, 2018, pp. 8789-8797.
Choi et al., "StarGAN v2: Diverse Image Synthesis for Multiple Domains", CVPR, IEEE, 2020, pp. 8188-8197.
Cook et al., "A Reflectance model for Computer Graphics", vol. 15, No. 3, Aug. 1981, pp. 307-316.
Debevec et al., "Acquiring the Reflectance Field of a Human Face", SIGGRAPH 2000 Conference Proceedings, 2000, pp. 145-156.
D'Eon et al., "Efficient Rendering of Human Skin", Eurographics Symposium on Rendering, 2007, 11 pages.
Feng et al., "Learning an Animatable Detailed 3D Face Model from In-The-Wild Images", ACM Trans. Graph, https://doi.org/10.1145/3450626.3459936, vol. 40, No. 4, Article 88, Aug. 2021, pp. 88:1-88:13.
Fyffe et al., "Near-Instant Capture of High-Resolution Facial Geometry and Reflectance", DOI: 10.1111/cgf.12837, vol. 35, No. 2, 2016, pp. 353-363.
Fyffe et al., "Comprehensive Facial Performance Capture", DOI:10.1111/j.1467-8659.2011.01888.x, vol. 30, No. 2, 2011, pp. 425-434.
Garbin et al., "High Resolution Zero-Shot Domain Adaptation of Synthetically Rendered Face Images", arXiv:2006.15031, Jun. 26, 2020, 17 pages.
Ghosh et al., "Multiview Face Capture using Polarized Spherical Gradient Illumination", ACM Transactions on Graphics, http://doi.acm.org/10.1145/2024156.2024163, vol. 30, No. 6, Article 129, Dec. 2011, pp. 129:1-129:10.
Ghosh et al., "Practical Modeling and Acquisition of Layered Facial Reflectance", ACM Transactions Graphics, vol. 27, No. 5, Dec. 2008, 10 pages.
Goodfellow et al., "Generative Adversarial Nets", Advances in Neural Information Processing Systems, 2014, 9 pages.
Gotardo et al., "Practical Dynamic Facial Appearance Modeling and Acquisition", ACM Trans. Graph, https://doi.org/10.1145/3272127.3275073, vol. 37, No. 6, Article 232, Nov. 2018, pp. 232:1-232:13.
Gotardo et al., "Photogeometric Scene Flow for High-Detail Dynamic 3D Reconstruction", ICCV, IEEE, 2015, pp. 846-854.
Härkönen et al., "GANSpace: Discovering Interpretable GAN Controls", 34th Conference on Neural Information Processing Systems, arXiv:2004.02546, Dec. 14, 2020, 29 pages.
Hu et al., "Simulation-Ready Hair Capture", In Computer Graphics Forum, vol. 36, No. 2, 2017, 14 pages.
Hu et al., "Robust Hair Capture Using Simulated Examples", ACM Transactions Graphics, vol. 33, No. 4, 2014, 10 pages.
Hu et al., "Single-View Hair Modeling Using A Hairstyle Database", ACM Transactions Graphics, vol. 34, No. 4, Jul. 2015, 9 pages.
Huang et al., "Face Translation between Images and Videos using Identity-aware CycleGAN", arXiv:1712.00971, Dec. 4, 2017, 9 pages.
Jimenez et al., "Screen-Space Perceptual Rendering of Human Skin", http://doi.acm.org/10.1145/1609967.1609970, ACM Transactions on Applied Perception, vol. 6, No. 4, Article 23, Sep. 2009, pp. 23:1-23:15.
Karras et al., "Progressive growing of Gans for improved Quality, Stability, and Variation", Published as a conference paper at ICLR, arXiv:1710.10196, Feb. 26, 2018, 26 pages.
Karras et al., "Alias-Free Generative Adversarial Networks", 35th Conference on Neural Information Processing Systems, 2021, 12 pages.
Karras et al., "A Style-Based Generator Architecture for Generative Adversarial Networks", CVPR, 2019, pp. 4401-4410.

(56) References Cited

OTHER PUBLICATIONS

Karras et al., "Analyzing and Improving the Image Quality of StyleGAN", CVPR, IEEE, 2020, pp. 8110-8119.
Kowalski et al., "CONFIG: Controllable Neural Face Image Generation", arXiv:2005.02671, Oct. 19, 2020, 28 pages.
Lattas et al., "AvatarMe: Realistically Renderable 3D Facial Reconstruction "in-the-wild"", CVPR, 2020, pp. 760-769.
Lin et al., "Towards High-Fidelity 3D Face Reconstruction from In-the-Wild Images Using Graph Convolutional Networks", CVPR, 2020, pp. 5891-5900.
Lombardi et al., "Neural Volumes Learning Dynamic Renderable Volumes from Images", ACM Trans. Graph., https://doi.org/10.1145/3306346.3323020, vol. 38, No. 4, Article 65, Jul. 2019, pp. 65:1-65:14.
Mallikarjun et al., "PhotoApp: Photorealistic Appearance Editing of Head Portraits", ACM Trans. Graph, https://doi.org/10.1145/3450626.3459765, vol. 40, No. 4, Article 44, Aug. 2021, pp. 44:1-44:16.
Martin-Brualla et al., "LookinGood: Enhancing Performance Capture with Real-time Neural Re-Rendering", ACM Trans. Graph, https://doi.org/10.1145/3272127.3275099, vol. 37, No. 6, Article 255, Nov. 2018, pp. 255:1-255:14.
Meka et al., "Deep Relightable Textures—Volumetric Performance Capture with Neural Rendering", ACM Trans. Graph., https://doi.org/10.1145/3414685.3417814, vol. 39, No. 6, Article 259, Dec. 2020, pp. 259:1-259:21.
Mildenhall et al., "NeRF: Representing Scenes as Neural Radiance Fields for View Synthesis", arXiv:2003.08934, Aug. 3, 2020, 25 pages.
Nalbach et al., "Deep Shading: Convolutional Neural Networks for Screen-Space Shading", DOI: 10.1111/cgf.13225, vol. 36, No. 4, 2017, pp. 65-78.
Nguyen-Phuoc et al., "HoloGAN: Unsupervised Learning of 3D Representations From Natural Images", ICCV, 2019, pp. 7588-7597.
Pernuš et al., "MaskFaceGAN: High Resolution Face Editing with Masked GAN Latent Code Optimization", arXiv:2103.11135, Jul. 1, 2021, 30 pages.
Richardson et al., "Encoding in Style: a StyleGAN Encoder for Image-to-Image Translation", CVPR 2021, pp. 2287-2296.
Riviere et al., "Single-Shot High-Quality Facial Geometry and Skin Appearance Capture", ACM Trans. Graph., https://doi.org/10.1145/3386569.3392464, vol. 39, No. 4, Article 81, Jul. 2020, pp. 81:1-81:12.
Schwarz et al., "GRAF: Generative Radiance Fields for 3D-Aware Image Synthesis", 34th Conference on Neural Information Processing Systems, arXiv:2007.02442, vol. 33, Mar. 30, 2021, 13 pages.
Shen et al., "FaceID-GAN: Learning a Symmetry Three-Player GAN for Identity-Preserving Face Synthesis", CVPR, 2018, pp. 821-830.
Shen et al., "InterFaceGAN: Interpreting the Disentangled Face Representation Learned by GANs", arXiv:2005.09635, Oct. 29, 2020, 16 pages.
Shen et al., "Closed-Form Factorization of Latent Semantics in GANs", CVPR, 2021, pp. 1532-1540.
Simonyan et al., "Very Deep Convolutional Networks for Large-Scale Image Recognition", ICLR 2015, arXiv: 1409.1556, 2015, 14 pages.
Wang et al., "Face Aging with Identity-Preserved Conditional Generative Adversarial Networks", CVPR, 2018, pp. 7939-7947.
Tewari et al., "StyleRig: Rigging StyleGAN for 3D Control over Portrait Images", CVPR, 2020, pp. 6142-6151.
Tewari et al., "PIE: Portrait Image Embedding for Semantic Control", ACM Trans. Graph., https://doi.org/10.1145/3414685.3417803, vol. 39, No. 6, Article 223, Dec. 2020, pp. 223:1-223:14.
Tewari et al., "State of the Art on Neural Rendering", Computer Graphics Forum, vol. 39, No. 2, arXiv:2004.03805, 2020, 27 pages.
Thies et al., "Deferred Neural Rendering: Image Synthesis using Neural Textures", vol. 38, No. 4, Apr. 28, arXiv:1904.12356, 2019, 12 pages.
Tov et al., "Designing an Encoder for StyleGAN Image Manipulation", ACM Trans. Graph, https://doi.org/10.1145/3450626.3459838, vol. 40, No. 4, Article 133, Aug. 2021, pp. 133:1-133:14.
Velinov et al., "Appearance Capture and Modeling of Human Teeth", ACM Trans. Graph, https://doi.org/10.1145/3272127.3275098, vol. 37, No. 6, Article 207, Nov. 2018, pp. 207:1-207:13.
Wang et al., "Deep Face Recognition: A Survey", Neurocomputing, https://doi.org/10.1016/j.neucom.2020.10.081, vol. 429, 2021, 76 pages.
Wu et al., "Model-Based Teeth Reconstruction", ACM Trans. Graph, vol. 35 No. 6, 2016, 100 pages.
Wu et al., "StyleSpace Analysis: Disentangled Controls for StyleGAN Image Generation", Nov. 2020, pp. 12863-12872.
Xia et al., "GAN Inversion: A Survey", arXiv:2101.05278, Aug. 13, 2021, 21 pages.
Yu et al., "BiSeNet V2: Bilateral Network with Guided Aggregation for Real-time Semantic Segmentation", arXiv:2004.02147, Apr. 5, 2020, 16 pages.
Yu et al., "BiSeNet: Bilateral Segmentation Network for Real-time Semantic Segmentation", ECCV, 2018, 17 pages.
Zhang et al., "The Unreasonable Effectiveness of Deep Features as a Perceptual Metric", CVPR, 2018, pp. 586-595.
Zhang et al., "Image Gans Meet Differentiable Rendering for Inverse Graphics and Interpretable 3D Neural Rendering", arXiv:2010.09125, Apr. 20, 2021, 25 pages.
Zhu et al., "In-Domain GAN Inversion for Real Image Editing", arXiv:2004.00049, Jul. 16, 2020, 31 pages.
Zhu et al., "Improved StyleGAN Embedding: Where are the Good Latents?", arXiv:2012.09036, Oct. 15, 2021, 16 pages.

\* cited by examiner

TECHNIQUES FOR ENHANCING SKIN RENDERS USING NEURAL NETWORK PROJECTION FOR RENDERING COMPLETION

CROSS-REFERENCE TO RELATED APPLICATIONS

This application claims priority benefit of the United States Provisional patent application titled, "PHOTOREALISTIC FACIAL RENDERING THROUGH STYLE-BASED NEURAL NETWORK PROJECTION," filed on Jan. 28, 2021 and having Ser. No. 63/142,957. The subject matter of this related application is hereby incorporated herein by reference.

BACKGROUND

Field of the Disclosure

Embodiments of the present disclosure relate generally to computer science and computer-generated graphics and, more specifically, to techniques for enhancing skin renders using neural network projection for rendering completion.

Description of the Related Art

Realistic digital head portraits are required for various computer graphics and computer vision applications. As used herein, a head portrait refers to a representation of a human head that includes regions corresponding to the skin of a face as well as non-skin regions that can correspond to eyes, ears, scalp hair, facial hair, inside of the mouth, parts of the neck and shoulder, etc. Digital head portraits oftentimes are used in the virtual scenes of film productions and in video games, among other things.

One approach for generating digital images of head portraits (also referred to herein as "head portrait images") involves capturing human faces and rendering the captured faces in images. However, conventional facial capture techniques are limited to capturing the skin regions of faces. Non-skin regions that are required for a head portrait are typically not captured. To generate a head portrait image that includes both skin and non-skin regions, the non-skin regions that are not captured need to be filled in, or "inpainted," after the captured skin regions are rendered. Conventional techniques for inpainting the non-skin regions of head portraits oftentimes cannot generate photorealistic head portrait images. In addition, to generate head portrait images having desired inpainting details (e.g., eyes and hair that look realistic), manual effort is required to tune the parameters used by conventional 3D modeling and 2D inpainting techniques, which can be tedious and time consuming.

Another conventional approach for generating head portrait images uses trained neural networks to generate synthetic images of head portraits. While the synthetic images can look photorealistic, conventional neural networks generally do not permit adjustments to the attributes of head portraits (e.g., the facial identity, expression, pose, lighting, etc.) without unintentionally affecting other attributes of those head portraits. Accordingly, conventional neural networks cannot be easily used to generate head portrait images having desired attributes. In particular, conventional techniques for generating head portrait images using neural networks are, as a general matter, unable to generate multiple head portraits images, such as the frames of a video, in which attributes of the head portraits are consistent and/or change gradually across consecutive images.

As the foregoing illustrates, what is needed in the art are more effective techniques for generating head portrait images that include skin and non-skin components without explicitly capturing and modeling each component, which can be tedious and labor intensive.

SUMMARY

One embodiment of the present disclosure sets forth a computer-implemented method for rendering a head portrait. The method includes rendering a first set of images, where each image included in the first set of images comprises one or more skin regions associated with a face. The method also includes determining a set of parameters based on one or more optimization operations, the first set of images, and a machine learning model. The method further includes generating a second set of images based on the set of parameters and the machine learning model, where each image included in the second set of images includes one or more skin regions associated with the face one or more non-skin regions. In addition, the method includes blending each image included in the first set of images with a corresponding image included in the second set of images.

Other embodiments of the present disclosure include, without limitation, a computer-readable medium including instructions for performing one or more aspects of the disclosed techniques as well as a computing device for performing one or more aspects of the disclosed techniques.

One technical advantage of the disclosed techniques relative to the prior art is the disclosed techniques can generate multiple images of head portraits, such as the frames of a video, in which rendered skin attributes of the head portraits are controlled as in traditional animation, while inpainted attributes are consistent and do not change significantly across consecutive images. Further, the disclosed techniques can be used to generate photorealistic head portrait images that include skin regions with high-quality details of captured faces, or synthetically generated faces, as well as plausible non-skin regions, without requiring significant manual intervention. The generated images can be used in various applications, such as in virtual scenes of film productions, in video games, virtual avatars for telepresence, and to train machine learning models. These technical advantages represent one or more technological advancements over prior art approaches.

BRIEF DESCRIPTION OF THE DRAWINGS

The patent or application file contains at least one drawing executed in color. Copies of this patent or patent application publication with color drawings will be provided by the Office upon request and payment of the necessary fee.

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

In the following description, numerous specific details are set forth to provide a more thorough understanding of the present disclosure. However, it will be apparent to one of skilled in the art that the present disclosure may be practiced without one or more of these specific details.

System Overview

Figure 1:
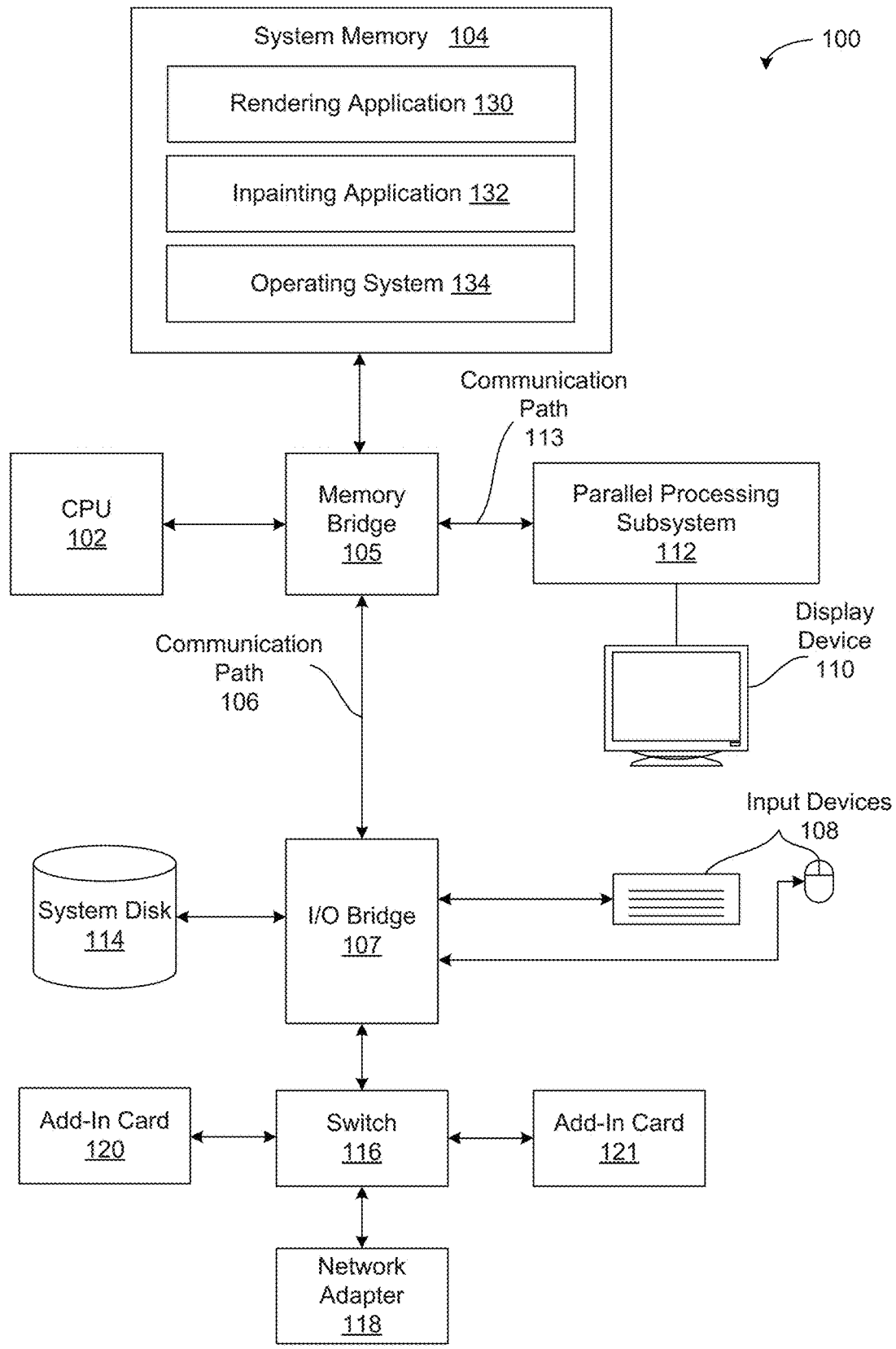
FIG. 1 is a conceptual illustration of a system configured to implement one or more aspects of the various embodiments.

FIG. 1 illustrates a system 100 configured to implement one or more aspects of the various embodiments. As shown, the system 100 includes, without limitation, a central processing unit (CPU) 102 and a system memory 104 coupled to a parallel processing subsystem 112 via a memory bridge 105 and a communication path 113. The memory bridge 105 is further coupled to an I/O (input/output) bridge 107 via a communication path 106, and the I/O bridge 107 is, in turn, coupled to a switch 116.

In operation, the I/O bridge 107 is configured to receive user input information from one or more input devices 108, such as a keyboard, a mouse, a joystick, etc., and forward the input information to the CPU 102 for processing via the communication path 106 and the memory bridge 105. The switch 116 is configured to provide connections between the I/O bridge 107 and other components of the system 100, such as a network adapter 118 and various add-in cards 120 and 121. Although two add-in cards 120 and 121 are illustrated, in some embodiments, the system 100 may only include a single add-in card.

As also shown, the I/O bridge 107 is coupled to a system disk 114 that may be configured to store content, applications, and data for use by CPU 102 and parallel processing subsystem 112. As a general matter, the system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to the I/O bridge 107 as well.

In various embodiments, the memory bridge 105 may be a Northbridge chip, and the I/O bridge 107 may be a Southbridge chip. In addition, communication paths 106 and 113, as well as other communication paths within the system 100, may be implemented using any technically suitable protocols, including, without limitation, AGP (Accelerated Graphics Port), HyperTransport, or any other bus or point-to-point communication protocol known in the art.

In some embodiments, the parallel processing subsystem 112 comprises a graphics subsystem that delivers pixels to a display device 110 that may be any conventional cathode ray tube, liquid crystal display, light-emitting diode display, or the like. In such embodiments, the parallel processing subsystem 112 incorporates circuitry optimized for graphics and video processing, including, for example, video output circuitry. Such circuitry may be incorporated across one or more parallel processing units (PPUs) included within the parallel processing subsystem 112. In other embodiments, the parallel processing subsystem 112 incorporates circuitry optimized for general purpose and/or compute processing. Again, such circuitry may be incorporated across one or more PPUs included within the parallel processing subsystem 112 that are configured to perform such general purpose and/or compute operations. In yet other embodiments, the one or more PPUs included within the parallel processing subsystem 112 may be configured to perform graphics processing, general purpose processing, and compute processing operations. The system memory 104 may include at least one device driver configured to manage the processing operations of the one or more PPUs within the parallel processing subsystem 112.

In various embodiments, the parallel processing subsystem 112 may be or include a graphics processing unit (GPU). In some embodiments, the parallel processing subsystem 112 may be integrated with one or more of the other elements of FIG. 1 to form a single system. For example, the parallel processing subsystem 112 may be integrated with the CPU 102 and other connection circuitry on a single chip to form a system on chip (SoC).

It will be appreciated that the system shown herein is illustrative and that variations and modifications are possible. The connection topology, including the number and arrangement of bridges, the number of CPUs, and the number of parallel processing subsystems, may be modified as desired. For example, in some embodiments, the system memory 104 could be connected to the CPU 102 directly rather than through the memory bridge 105, and other devices would communicate with the system memory 104 via the memory bridge 105 and the CPU 102, In other alternative topologies, the parallel processing subsystem 112 may be connected to the I/O bridge 107 or directly to the CPU 102, rather than to the memory bridge 105. In still other embodiments, the I/O bridge 107 and the memory bridge 105 may be integrated into a single chip instead of existing as one or more discrete devices. In some embodiments, any combination of the CPU 102, the parallel processing subsystem 112, and the system memory 104 may be replaced with any type of virtual computing system, distributed computing system, or cloud computing environment, such as a public cloud, a private cloud, or a hybrid cloud. Lastly, in certain embodiments, one or more components shown in FIG. 1 may not be present. For example, the switch 116 could be eliminated, and the network adapter 118 and add-in cards 120, 121 would connect directly to the I/O bridge 107.

Illustratively, the system memory 104 stores a rendering application 130, an inpainting application 132, and an operating system 134 that facilitates the execution of the rendering application 130 and the inpainting application 132. The operating system 134 can be, e.g., Linux® or Microsoft Windows®. The rendering application 130 is configured to render images that include the skin regions of faces. The inpainting application 132 is configured to inpaint non-skin regions in images rendered by the rendering application 130. In some embodiments, the inpainting application 132 performs, for a set of images rendered by the rendering application 130, a constrained optimization technique to determine an optimized set of parameters that, when input into a generator model, produces a set of projection images that include (1) skin regions resembling skin regions in the images rendered by the rendering application 130, and (2) matching non-skin regions in the case where the rendered set of images are standalone images or smoothly transitioning non-skin regions in the case where the rendered set of images are frames of a video, as discussed in greater detail below in conjunction with FIGS. 2-12. In addition, the inpainting application 132 blends the set of images rendered by the rendering application 130 with the set of projection images to generate a set of composite images for output. Although shown as distinct applications for illustrative purposes, in some embodiments, functionality of the rendering application 130 and the inpainting application 132 can be combined together or distributed across any number of pieces of software and/or hardware.

Enhancing Skin Renders Using Neural Network Projection for Rendering Completion

Figure 2:
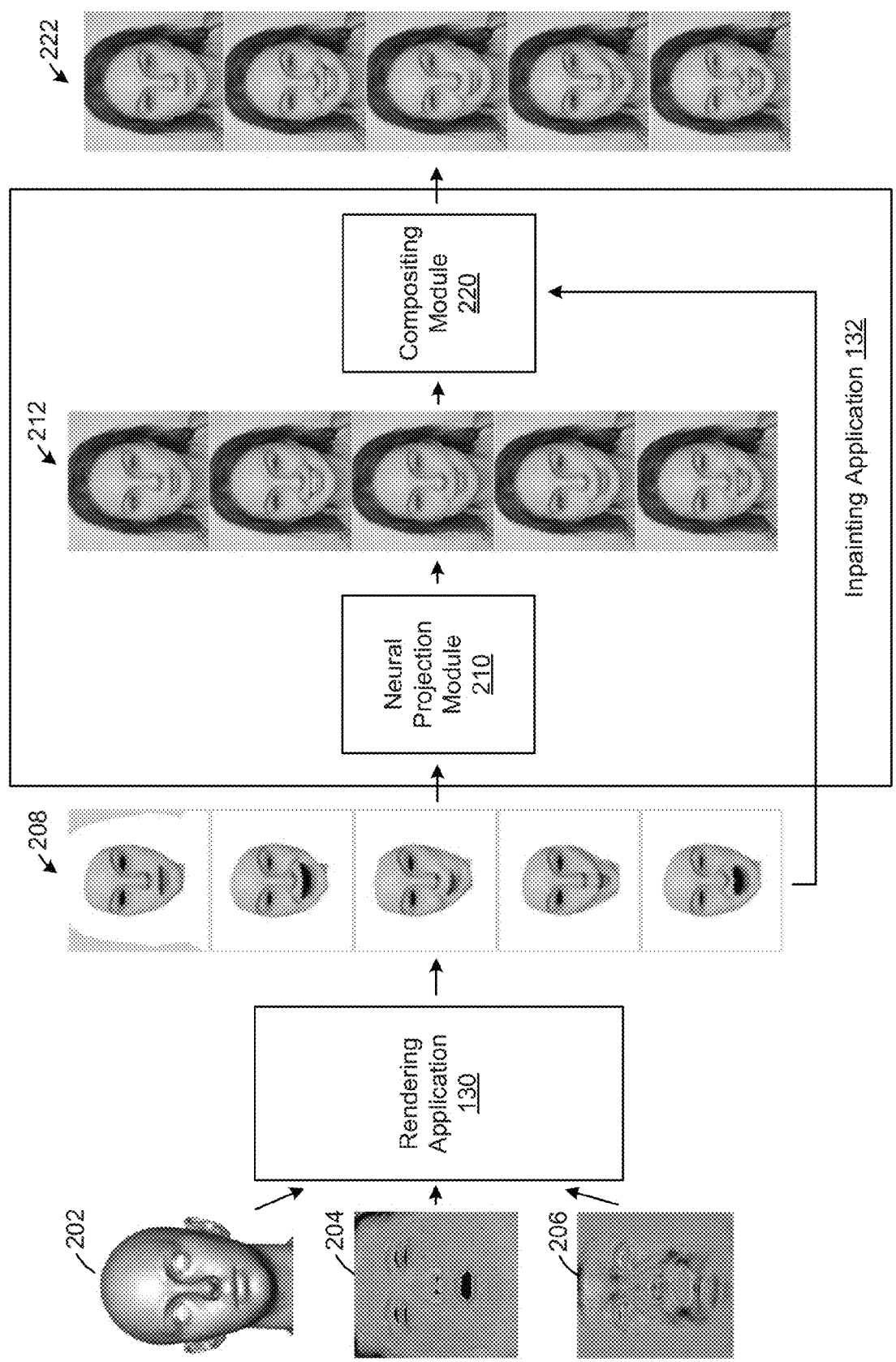
FIG. 2 illustrates the rendering application and the inpainting application of FIG. 1 in greater detail, according to various embodiments.

FIG. 2 illustrates the rendering application 130 and the inpainting application 132 of FIG. 1 in greater detail, according to various embodiments. As shown, the rendering application 130 takes as inputs skin geometry 202 of a face and associated appearance maps that can indicate diffuse and specular albedo and specular roughness, among other things. Illustratively, the appearance maps include an albedo map 204 that indicates colors of the skin and a specular intensity map 206 indicating how the skin reflects light. In some embodiments, the facial skin geometry 202 can include a high-resolution 3D mesh and a displacement map that captures fine geometric details down to the pore level. A UV-parameterization can be used to define the space of the appearance maps, including the albedo map 204 and the specular intensity map 206, as well as the displacement map. The facial skin geometry 202, the albedo map 204, and the specular intensity map 206 can be created in any technically feasible manner, including by capturing a human face using known facial capture techniques, such as a photogrammetry system, or by synthesizing a digital human using automated techniques, such as a facial geometry variational autoencoder, and/or manually.

Given the facial skin geometry 202, the albedo map 204, and the specular intensity map 206, the rendering application 130 renders a set of images 208 (referred to herein collectively as "rendered images 208" and individually as "a rendered image 208") of skin of the face. Further, the set of images 208 can be rendered using an environment map that indicates desired environmental lighting. Each of the rendered images 208 can be a standalone image or a frame of an image sequence, for animation in video. Any technically feasible rendering technique, such as a ray tracing technique, can be used to render the rendered images 208. For example, the rendering application 130 can perform a ray tracing technique to render the skin as a two-layer model in which a top layer is described by a Cook-Torrance microfacet bidirectional reflectance distribution function (BRDF) model covering a diffuse layer in which subsurface scattering is modeled through diffusion using a texture-space technique. In some embodiments, the rendering application 130 further renders, for each rendered image 208, a mask (not shown) that covers only skin regions (i.e., pixels) of the rendered image 208. In addition, in some embodiments, the rendering application 130 can align the rendered images 208 (and corresponding masks) to a 2D canonical space in any technically feasible manner, including via well-known techniques.

The inpainting application 132 takes as inputs the rendered images 208 (and corresponding masks). Given the rendered images 208 (and corresponding masks), a neural projection module 210 of the inpainting application 132 generates a set of neural projection images 212 (referred to herein collectively as "projection images 212" and individually as "a projection image 212") that include head portraits in which (1) skin regions (i.e., pixels) resemble the skin regions in corresponding rendered images 208 in terms of facial identity, viewpoint, and illumination; and (2) non-skin regions (i.e., pixels) can include plausible eyes, ears, scalp hair, facial hair, inside of the mouth, parts of the shoulder, background, etc. that are not in the rendered images 208. As used herein, a "facial identity" refers to aspects of a facial appearance that are considered distinct and help differentiate one face from another face. In some embodiments, the neural projection module 210 projects the rendered images 208 into the latent space of a pre-trained generator model to obtain the projection images 212. Such a projection can include performing a constrained optimization technique, discussed in greater detail below in conjunction with FIG. 3, that (1) constrains the skin regions of the projection images 212 to resemble the skin regions of corresponding rendered images 208, and (2) constrains the non-skin regions of the projection images 212 to match each other in the case of a set of standalone images or to transition smoothly between consecutive frames in the case of frames of a video. Without constraint (2), the non-skin regions of each of the projection images 212 can differ, which may be undesirable. For example, the non-skin regions of the frames of a video should, as a general matter, not change significantly from frame to frame to preserve the facial identity.

As shown, a compositing module 220 takes the rendered images 208 (and corresponding masks, if any) and the projection images 212 as inputs and blends corresponding pairs of images 208 and 212 together to generate composite images 222. The composite images 222 are images of head portraits that include skin regions from the rendered images 208 and non-skin regions from corresponding projection images 212. In some embodiments, the compositing module 220 performs an image space compositing technique in which each mask corresponding to a rendered image 208 is blurred (e.g., via Gaussian blurring) and used as an alpha matte to blend that rendered image 208 onto a corresponding projection image 212.

Figure 3:
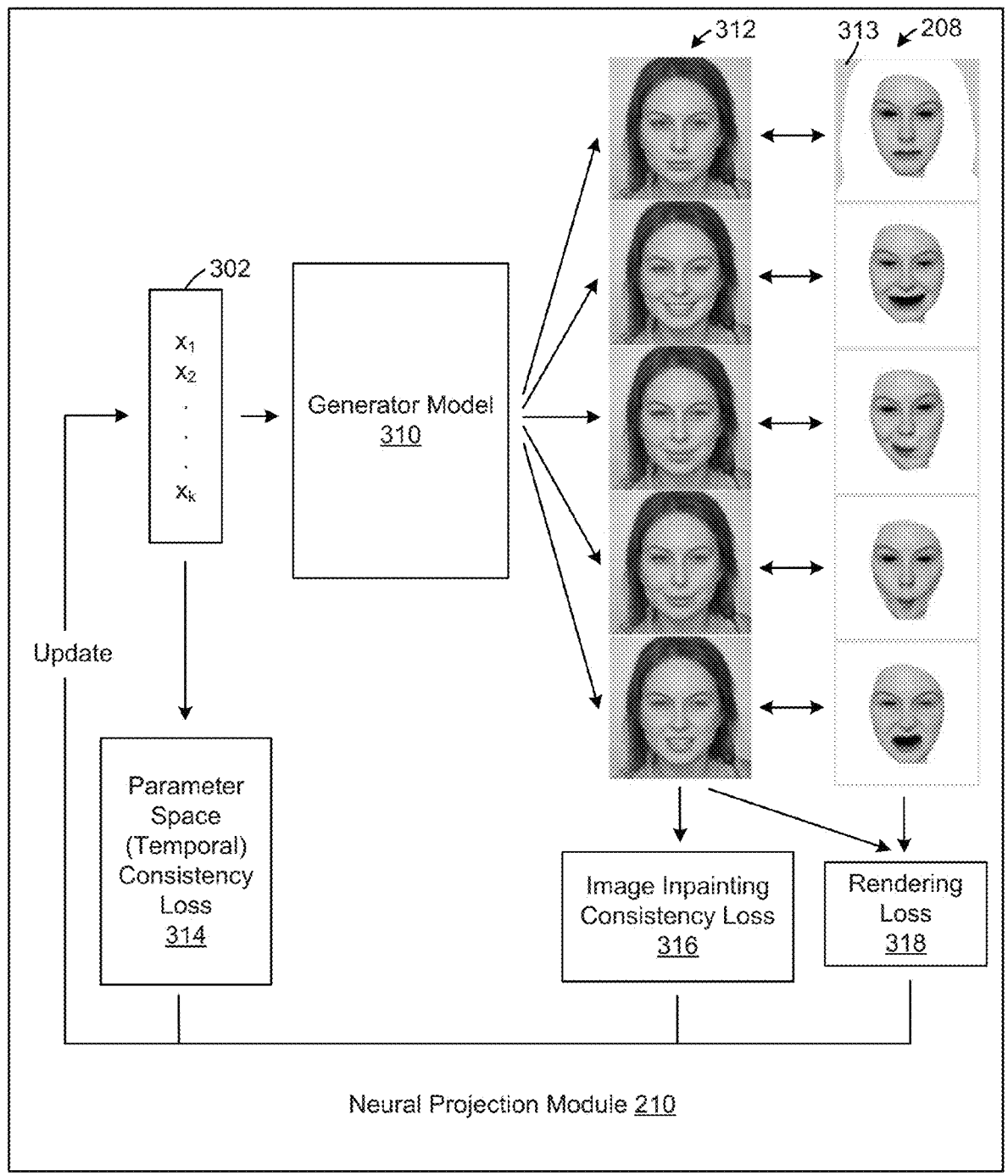
FIG. 3 illustrates the neural projection module of FIG. 2 in greater detail, according to various embodiments.

FIG. 3 illustrates the neural projection module 210 of FIG. 2 in greater detail, according to various embodiments. As shown, the neural projection module 210 includes a generator model 310. In some embodiments, the generator model 310 is a machine learning model that takes a set of parameters 302 as input and outputs a set of images 312 that include head portraits. For example, the generator model 310 could be a style-based neural network, such StyleGAN or StyleGAN2. In such cases, the style-based neural network can be pre-trained, using a large number of images and adversarial learning, to take as input noise parameters and output a photorealistic image. In operation, the neural projection module 210 iteratively (1) inputs parameters in the set of parameters 302 into the generator model 310, which outputs corresponding images 312 (referred to herein collectively as "projection images 312" and individually as "a projection image 312"), (2) computes a parameter space consistency loss 314 based on the set of parameters 302, an image inpainting consistency loss 316 based on the projection images 312, and a rendering loss 318 based on a comparison of the skin regions of the projection images 312 and corresponding rendered images 208; and (3) updates the set of parameters 302 based on the parameter space consistency loss 314, the image inpainting consistency loss 316, the rendering loss 318, and an iterative optimization technique such as the gradient descent technique or a variant thereof. Over a number of iterations, the set of parameters 302 can be optimized to minimize a combination of the parameter space consistency loss 314, the image inpainting consistency loss 316, and the rendering loss 318. When the optimized set of parameters 302 is input into the generator model 310, the generator model 310 outputs a set of projection images 312 that include (1) skin regions that resemble the skin regions in corresponding rendered images 208, and (2) non-skin regions that match the non-skin regions of other images in the set of projection images 312 in cases when the set of projection images 312 includes standalone images or that transition smoothly between frames in cases when the set of projection images 312 includes frames of a video.

More specifically, given an input sequence of K high-quality rendered images $I_k$, depicting the skin surface of a particular face, the goal is to generate a new sequence of projection images of head portraits $P_k$:

$$P_k = \text{Generator}(x_k) \approx I_k, k \in 1, 2, \ldots, K, \quad (1)$$

using the generator model 310, denoted by Generator(·). For example, a pre-trained StyleGAN2 generator could be used as the generator model 310. Although described herein primarily with respect to StyleGAN2 as a reference example, other machine learning models can be used in some embodiments. Following the natural analysis-by-synthesis approach for fitting morphable face models to images, sets of input parameters $x_k$ into StyeGAN2 can be optimized to generate projection images $P_k$ whose skin regions resemble the skin regions of the high-quality physically-based rendering images $I_k$. Each of the input parameters $x_k$ can be represented as a vector of parameters in some embodiments, and an input parameter $x_k$ is also referred to herein as a parameter vector $x_k$. The correlations learned by StyleGAN2 can be used to plausibly and realistically inpaint the non-skin regions that are missing in each rendered image $I_k$. Assuming that all of the rendered images $I_k$ depict the same individual, the facial identity of that individual should be preserved with high fidelity while generating non-skin regions, including missing facial elements and surrounding features, in a semantically consistent manner over the output sequence of projection images $P_k$. These requirements rule out the straightforward approach of optimizing each projection image $P_k$ independently, for two main reasons: (1) even the optimization of a single latent code for StyeGAN2 can be a nontrivial, nonlinear optimization problem that can lead to different local optima, corresponding to different inpainted areas; and (2) a naïve, greedy projection strategy can overfit the highly-detailed skin renders in each rendered image $I_k$ and, as a side effect, small spurious correlations learned by the generator model 310 can introduce inconsistencies into the unconstrained inpainted areas.

To generate a sequence of projection images of head portraits with inpaintings that are semantically consistent and realistic, the neural projection module 210 projects all of the input rendered images $I_k$ simultaneously, while also enforcing additional constraints on the projection images $P_k$ and on the associated set of parameters $x_k$ that are input into StyleGAN2. The search for the optimal set of image parameters X can be formulated as an energy minimization problem over the entire input image sequence $I = \{I_1, I_2, \ldots, I_K\}$, $$\min_X E_{rend}(X, I) + E_{cons}(X), X = (x_k, k = 1, 2, \ldots, K). \quad (2)$$

Such an energy minimization problem involves not only a data term with rendering constraints $E_{rend}(X, I)$ (also referred to herein as the "rendering energy"), masked by the skin pixels mask, but also an inpainting consistency energy $E_{cons}(X)$ that largely operates in the null space of the rendering energy $E_{rend}(X, I)$.

To derive a parameterization for the non-trivial, non-linear energy minimization problem, described above, the skin regions of the projection images $P_k$ do not have to match exactly the skin regions of the rendered images $I_k$, because the rendered skin appearance can be restored by blending the rendered images $I_k$ with the projection images $P_k$. Instead, the main goal is the inpainting of missing regions in the rendered images $I_k$, which should look realistic and correlate well with the rendered skin regions. Further, to ensure that the projection images $P_k$ look realistic, the solutions to the energy minimization problem should remain in a well-behaved location of the parameter space of StyleGAN2. In addition, experience has shown that an unconstrained projection of partial renders into StyleGAN2 can result in unrealistic inpaintings. For these reasons, in some embodiments, each parameter vector $x_k$ can be modeled using convex linear combinations of N known, latent basis vectors $b_n$ that are randomly sampled in a well-behaved region, such as a region around an origin or mean, of the latent space of StyleGAN2, As used herein, well-behaved means the sampled latent basis vectors can be input into StyleGAN2 (or another generator model) to generate head portrait images with valid expressions, backgrounds, lighting, etc. and little or no artifacts. Given the latent basis vectors that are sampled in the well-behaved region, the goal of optimization is to obtain weights that can be used to combine the latent basis vectors to produce new latent vectors that are in the convex hull of the latent basis vectors and can be input into the StyleGAN2 to generate a set of head portrait images in which the facial identity and expressions resemble the facial identity and expressions in the rendered images 208.

In some embodiments, basis vectors in the initial Z-space can be sampled and fed through different multilayer-perceptrons (MPLs) within StyleGAN2, at each resolution level, to obtain basis vectors $b_n$ in the final S-space. For example, 64 or 128 basis vectors can be sampled in some embodiments. Truncation can also be applied to remain in a well-behaved region near the origin of the latent space of StyleGAN2. The pre-generated basis vectors can form N columns of a basis matrix B. The basis matrix B can further be uniformly split into a number of fixed-size segments $B_c$ of contiguous rows, $c \in \{1, \ldots, C\}$. Then, the parameter vector $x_k$ can be modeled as a linear combination of the basis vectors $b_n$, as follows:

$$x_k = \begin{bmatrix} B_1 & & & \\ & B_1 & & \\ & & \ddots & \\ & & & B_C \end{bmatrix} \begin{bmatrix} \alpha_{k1} \\ \alpha_{k2} \\ \vdots \\ \alpha_{kC} \end{bmatrix}, \text{s.t.} \begin{cases} \alpha \geq 0, \forall \alpha \in \alpha_{kc} \\ \|\alpha_{kc}\|_1 = 1, \forall kc \end{cases}, \quad (3)$$

where each $\alpha_{kc} \in \mathbb{R}^N$ has weights of a convex linear combination that represents a segment of the parameter vector $x_k$. Given the foregoing formulation, solving for the optimal set of image parameters X corresponds to optimizing for K weight vectors $\alpha_k = [\alpha_{k1}, \alpha_{k2}, \alpha_{kC}] \in \mathbb{R}^{NC}$.

It should be noted that the representation in which the basis matrix B is split into a number of fixed-size segments $B_c$ of contiguous rows, i.e., into C partitions, allows control over the number of degrees of freedom in the parameterization $\alpha_k$ and its expressibility (i.e., more per-segment weights). In particular, the C partitions permit a balance between exploring parameter correlations within each block $B_c$, while also benefiting from relatively good semantic disentanglement across the different blocks $B_c$, which define relatively good building blocks of solutions to the optimization problem with relatively high realism.

Figure 4:
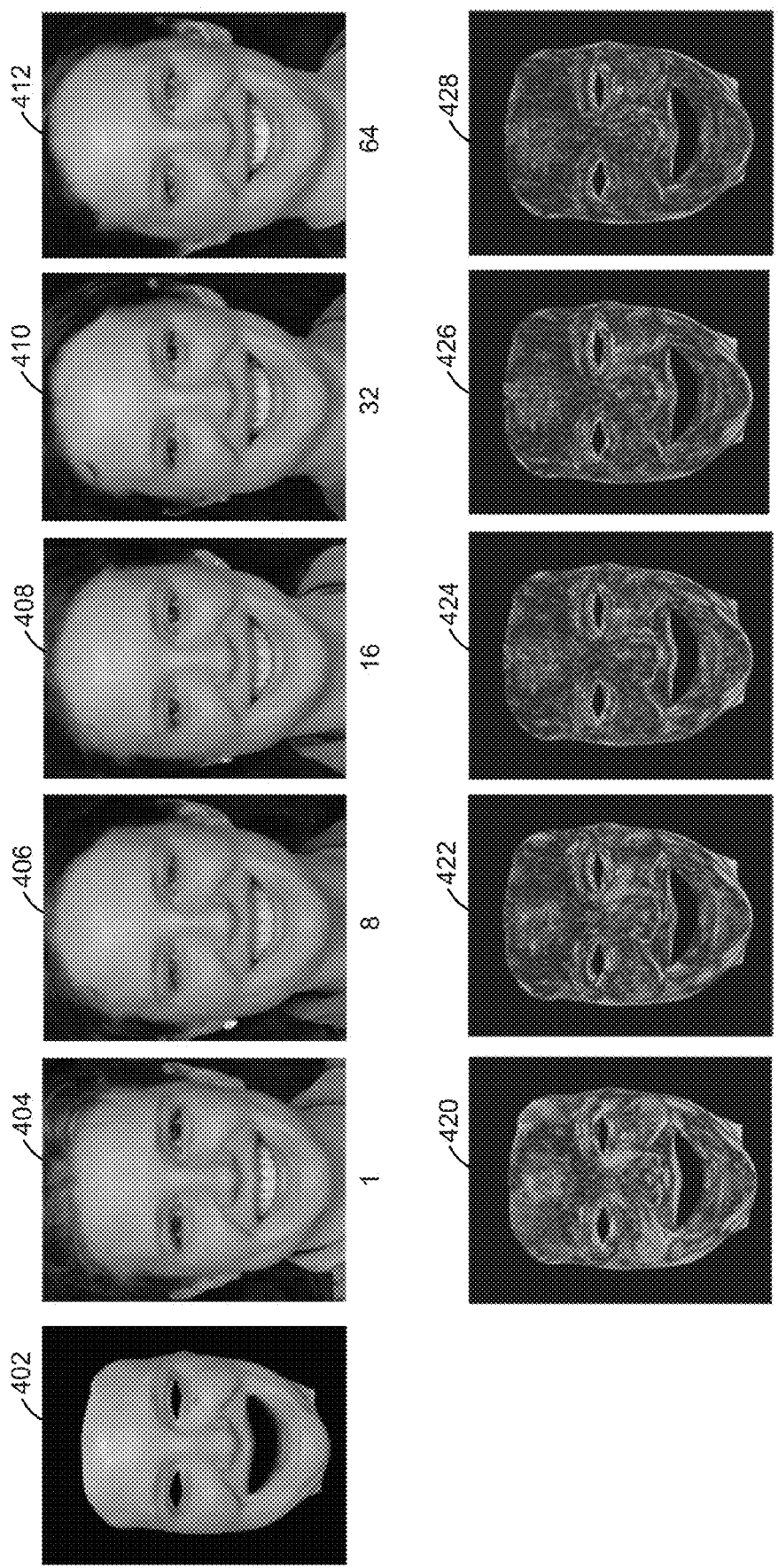
FIG. 4 illustrates exemplar projection images and associated rendering losses when a parameter vector is split into different numbers of segments, according to various embodiments.

FIG. 4 illustrates exemplar projection images and associated rendering losses when a parameter vector $x_k$ is split into different numbers of segments, according to various embodiments. As shown, projection images 404, 406, 408, 410, and 412 can be generated by splitting the parameter vector into 1, 8, 16, 32, and 64 segments, respectively. Illustratively, splitting the parameter vector into 64 segments per layer is enough to yield a relatively good fit (i.e., a match to the facial identity and expression) to the skin target of a rendered image 402. Error plots 420, 422, 424, 426, and 428 indicate the per-pixel norm of RGB (red, green, blue) errors between the skin regions of projection images 404, 406, 408, 410, and 412, respectively, and the skin regions of the rendered image 402, on a scale of 0-1. In some embodiments, a set of N=64 random basis vectors can be sampled and portioned into 64 segments per resolution layer of StyleGAN2 (i.e., C=1152 segments in total), and segment lengths do not change during optimization.

Returning to FIG. 3, during iterations of the optimization performed by the neural projection module 210, weights $\alpha_{kc}$ of each segment can be passed through a softmax function before the weights are applied to corresponding basis vectors to obtain the set of parameters $x_k$. Doing so ensures that the blended segment of any given parameter $x_k$ is always within the convex hull of the basis segments. Although the total number of (softmax) weights in each vector $\alpha_k$ seems large, in practice very few of the weights are non-zero (e.g., roughly 6 per segment $\alpha_{kc}$). In the following, for simplicity of notation, optimization energies are defined in terms of the image parameters X, parameters $x_k$, projection images $P_k$, and rendered images $I_k$.

As described, the basis vectors $b_n$ can be defined in the S-space of StyleGAN2 in some embodiments. In such cases, the image parameters X can be optimized in the S-space, which provides a relatively good level of feature disentanglement and fine control.

To introduce spatial variability and detail, StyleGAN2 adds random noise maps to the intermediary feature channels of the StyeGAN2 model at different resolutions. The random noise perturbations affect the generated images locally by, for example, changing a smooth hairstyle to a fuzzier one. In some embodiments, a single set of spatial noise maps, at different resolutions, is shared by all of the generated projection images $P_k$. The set of spatial noise maps can be sampled randomly and generally do not need to be fit to input rendered images 208, except in the case of animations that include camera viewpoint changes where the fixed 2D detail generated by the noise maps would be inconsistent with the 3D projections. In such cases, the noise component can be disabled.

As described, the search for the optimal set of image parameters X can be formulated as an energy minimization problem in which the enemy includes a rendering energy $E_{rend}(X,I)$, shown as the rendering loss 318, and an inpainting consistency energy $E_{cons}(X)$, shown as the image inpainting consistency loss 316. As a general matter, the generator model 310 (e.g., StyleGAN2) is not required to match with high fidelity the unique identity features in the high-quality rendered images $I_k$. Instead, optimization can be focused on guiding the inpainting of missing regions onto a projection image $P_k$, without overfitting the rendered images $I_k$, and fine details of the rendered images $I_k$ can then be embossed onto the projection image $P_k$ in a final compositing step, described above. In some embodiments, the rendering energy $E_{rend}(IX, I)$ includes a combination of the LPIPS (Learned Perceptual Image Patch Similarity) loss and a face segmentation loss:

$$E_{rend}(X,I) = \lambda_{rend}\Sigma_k \|M_k(\phi(I_k) - \phi(P_k))\|_F^2 + \quad (4)$$

$$\lambda_{seg}\Sigma_k \|M_k(\Psi(I_k) - (P_k))\|_F^2. \quad (5)$$

In equations (4)-(5), On denotes the set of feature activations from layers conv1-1, conv1-2, conv2-2, conv3-3 of a pre-trained VGG-16 network; $M_k$ denotes the masking of only features corresponding to rendered skin regions in each rendered image $I_k$, and the weights $\lambda_{rend}$ and $\lambda_{seg}$ are used to balance the strengths of the energies of equations (4) and (5) relative to the consistency constraints, described in greater detail below, so as to avoid overfitting. Optionally, the LIPIPS loss of equation (4) can include small areas with render targets for background pixels, such as region 313 in the rendered images 208, which provide a relatively simple mechanism for controlling the inpainting of the background. In some embodiments, the per-image background constraints can include scribble lines or parts of existing images (e.g. a lat-long environment map used to render skin targets), among other things, which can provide additional information on background visibility and even lighting that is useful as soft constraints to guide inpainting during the optimization (to, e.g., match an image used as the environment map for rendering the rendered images 208). In some other embodiments, the LIPIPS loss of equation (4), or another loss term, can be used to constrain the optimization to generate projection images in which non-skin regions (e.g., eyes, hair, background, etc.) match the non-skin regions of an existing image, such as one frame of a video.

To generate projection images P with a better alignment of the contours of the eyes and mouth regions, the segmentation loss term of equation (5) can be based on activations of the final feature layer $\Psi(\cdot)$ of a face segmentation network, before a last softmax layer of the face segmentation network. Accordingly, different parts of the skin regions in the rendered images 208 and the projection images 312 can be segmented, and the segmentation loss term of equation (5) is used to compare those segmentations so that the optimization process ensures that the skin regions of the projection images 312 have similar spatial layout and structure as the skins regions of corresponding rendered images 208. Experience has shown that the segmentation loss term of equation (5) can substantially improve the alignment of facial features, especially the lips, between the rendered images 208 and corresponding projection images 312. The segmentation loss term can also be used to control the spatial layout of inpainted terms.

Figure 5:
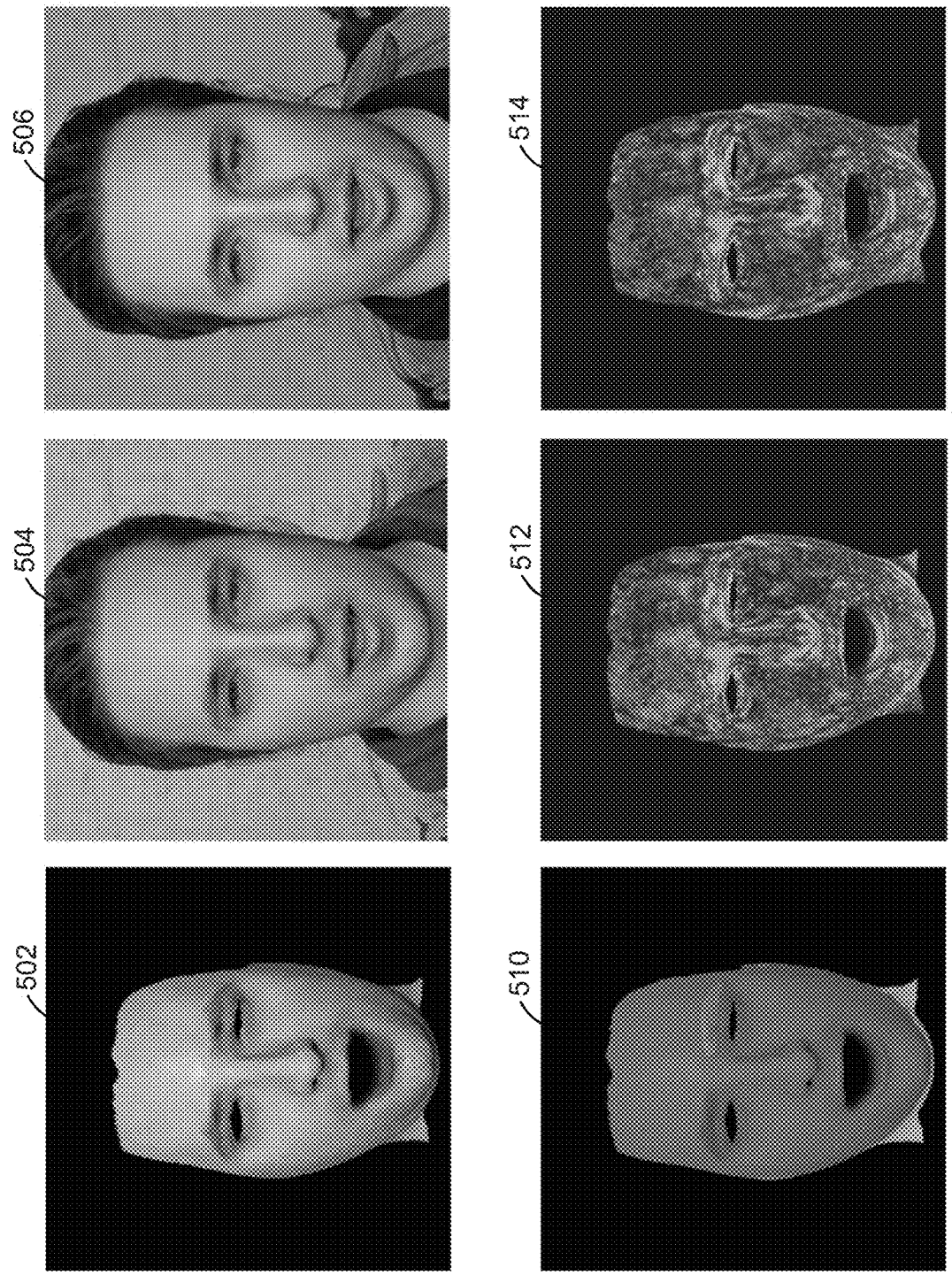
FIG. 5 illustrates exemplar renderings when a face segmentation loss is used and when the face segmentation loss is not used, according to various embodiments.

FIG. 5 illustrates exemplar head portrait images when the face segmentation loss of equation (5) is used and when that face segmentation loss is not used, according to various embodiments. As shown, a rendered image 502 of the skin of a face can be segmented, as described above, to generate a segmentation 510. The segmentation 510 can then be used in the segmentation loss term of equation (5) to generate a projection image 506 in which facial features, such as the mouth, match more closely to corresponding facial features of the rendered image 502 than facial features of a projection image 504 generated without a segmentation loss term match. The improved match is shown in the error plots 512 and 514, which indicate the per-pixel norm of RGB (red, green, blue) errors between the skin regions of the projection images 504 and 506, respectively, and the skin regions in the rendered image 502, on a scale of 0-1.

Returning to FIG. 3, in some embodiments, the parameter space consistency loss 314 and the image inpainting consistency loss 316 can be included in the following inpainting consistency energy $E_{cons}(X)$ that includes different terms in both the StyleGAN2 S-space and on the projection image plane:

$$E_{cons}(X) = \lambda_{mean}\Sigma_k \|x_k - \bar{x}\|_2^2 + \quad (6)$$

$$\lambda_{temp}\Sigma_k \|x_k - x_{k-1}\|_2^2 + \quad (7)$$

$$\lambda_{inpt}\Sigma_k \|\tilde{M}_k(\phi(P_k) - \phi(\bar{P})\|_2^2. \quad (8)$$

The loss term of equation (6), which correspond to the parameter space consistency loss 314, promote consistency in the parameter space of the set of parameters 302. More specifically, the loss term of equation (6) promotes consistency by minimizing the variance of each style parameter of the vectors $x_k$, and x denotes the mean vector. Equation (6) constrains the optimized set of parameters 302 to be as dose as possible to the mean vector so that the projection images 312 that are generated via the optimization have good visual characteristics.

The loss terms of equations (7)-(8), which correspond to the inpainting consistency loss 316, help to ensure that the optimized set of parameters 302 changes smoothly between consecutive frames when the rendered images 208 are frames of a video, and that non-skin regions in the projection images 312 are essentially identical when the rendered images are not frames of a video. When the sequence of projection images 312 has a well-defined temporal ordering (e.g., in an animation), a non-zero weight term $\lambda_{temp}$ is used in equation (7) to penalize differences between temporal neighbors in the ordering. For example, if a head portrait begins with a neutral expression in the first frame of a video and slowly transitions into a smile in later frames of the frames, the set of parameters 302 should also change gradually to produce smoothly transitioning inpainting results. The constraint of equation (7) enforces inpainting consistency by effectively minimizing the length of the path from the first through the last images (e.g., the first and last frames of an animation) of the ordering in latent space. The loss term of equation (8) enforces consistency of inpainted regions (e.g., hair, eyes, teeth, etc.) and is applied on the image plane, where the spatial extent of consistency constraints can be better specified. To better tolerate small in-plane motions, the LPIPS perceptual loss, described above in conjunction with equation (4), can be applied on the inpainted regions. The loss term of equation (8) can be disabled (i.e., $\lambda_{inpt}=0$) when the camera view (and head pose) changes significantly throughout the projection images 312 and large in-plane motions of inpainted regions is expected, and when different per-image background targets are provided in the rendering term of equation (4). The anchoring target P for the inpainted regions can be automatically generated by (1) computing a rough solution X with a single parameter segment (C=1 in equation (3)); (2) computing, from the rough solution X, a mean projection $\bar{P}$, generated from the mean k in latent space; and then (3) penalizing variations from the average inpainting on the image plane using a complement mask $\tilde{M}_k$, which does not affect skin regions in the rendered images 208. It should be noted that the parameterization described above already guarantees that the projection images 312 remain in a well-behaved region of the latent parameter space of StyleGAN2, and no other regularization term is needed to prevent drifting towards unrealistic face projections.

The neural projection module 210 can perform the optimization using the parametrization and energies, described above, in any technically feasible manner. For example, in sortie embodiments, the neural projection module 210 can utilize the Adam optimizer. To optimize over arbitrarily long sequences of K neural projections, the global set of parameters X can be stored in a K×N×C tensor. As described above, N=64 basis vectors and C=1.152 parameter segments can be used in some embodiments. The tensor can be optimized over multiple epochs, similar to training a neural network. At each iteration in an epoch, a small temporal window (batch) of consecutive parameter vectors $x_k$ are fed through the StyleGAN2 generator (or another generator model) to obtain images that are subject to the rendering and consistency constraints, described above. As a result, the set of parameters X can be optimized without constraining the sequence length K or running into processor memory bottlenecks. In some embodiments, optimization can be run for 200 iterations with a batch size of 2 projections, a learning rate lr=0.1, and weights for the energy terms of equations (4)-(8) set as: $\lambda_{rend}=1$, $\lambda_{seg}=0.01$, $\lambda_{mean}=0.0001$, $\lambda_{temp}=0.0001$, $\lambda_{inpt}=0.1$.

As described above in conjunction with FIG. 2, projection images 212 generated by the neural projection module 210 are blended, by the compositing module 220, with the rendered images 208 to generate the composite images 222. Such blending is required because, although powerful, generator models such as StyleGAN2 generally cannot identically reproduce the high-frequency details of skin in the input rendered images 208. As a result, after the optimization described above in conjunction with FIG. 3, which is designed to compute projection images 212 that match corresponding rendered image 208 only closely enough to provide high-quality, realistic inpaintings for non-skin regions that are missing in each rendered image 208, small discrepancies can exist between the skin regions in the rendered images 208 and corresponding projection images 212. To correct such discrepancies, the compositing module 220 blends the rendered images 208 with the projection images 212 to generate composite images that combine the skin regions from the rendered images 208 with the inpainted non-skin regions from the projection images 212. More formally, the compositing can blend details from a rendered image $I_k$ onto the projection image $P_k$ to generate a composite image $I_k^*$, as follows:

$$I_k^* = (G*\hat{M}_k)I_k + (1 - G*\hat{M}_k)P_k \quad (9)$$

In equation (9), G denotes a Gaussian filter that is convolved on the skin mask $M_k$ to yield an alpha matte that has ones within the rendered skin regions, zeroes outside the rendered skin regions, and blends smoothly at borders between the inside and outside of the rendered skin regions. For better blending, $\hat{M}_k$ can be obtained by first applying morphological erosion (e.g., 30 steps of 1 pixel) on the original skin mask $M_k$, before the Gaussian blur.

Experience has shown that the techniques described above in conjunction with FIGS. 2-3 can be used to robustly render images of different facial expressions, lighting conditions, environment maps, and viewpoints to some extent.

Figure 6:
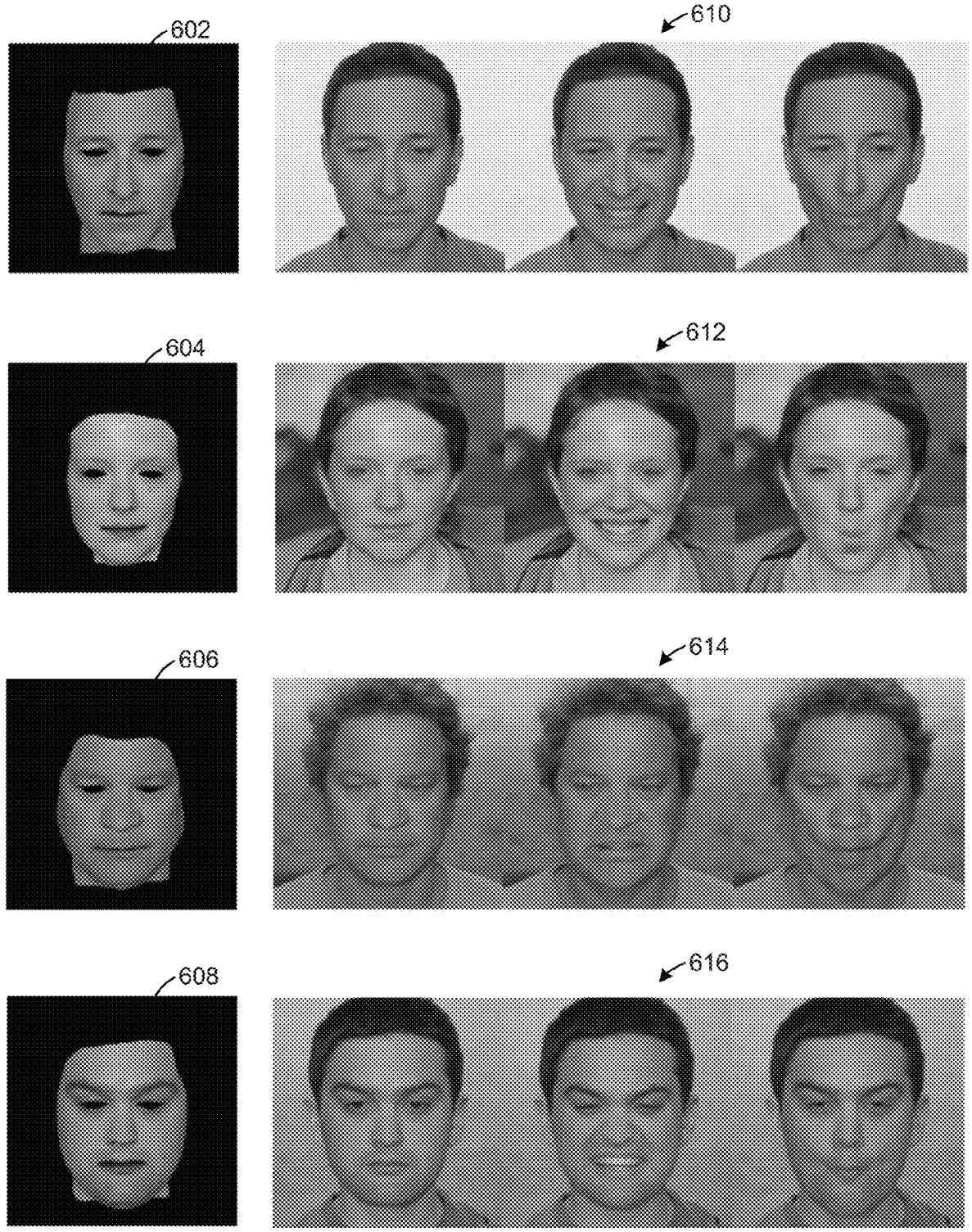
FIG. 6 illustrates exemplar head portrait images with different expressions, according to various embodiments.

FIG. 6 illustrates exemplar head portrait images with different expressions, according to various embodiments. As shown, images 602, 604, 606, and 608 have been rendered (by, e.g., rendering application 130) to include the skin of different facial identities. Similar images (not shown) of the facial identities, but with different expressions, can also be rendered. Given the rendered images 602, 604, 606, and 608 of facial identities and the rendered images of the facial identities with different expressions, the inpainting application 132 can generate corresponding composite images, shown as sets of composite images 610, 612, 614, and 616. In the sets of composite images 610, 612, 614, and 616, missing non-skin regions of the rendered images 602, 604, 606, and 608 and of the rendered images with different expressions are inpainted via neural projection, as described above in conjunction with FIGS. 2-3. As shown, each of the sets of composite images 610, 612, 614, and 616 include consistent inpaintings across different expressions that also match the skin regions of the rendered images of different facial identities and expressions (e.g., rendered images 602, 604, 606, and 608).

Figure 7:
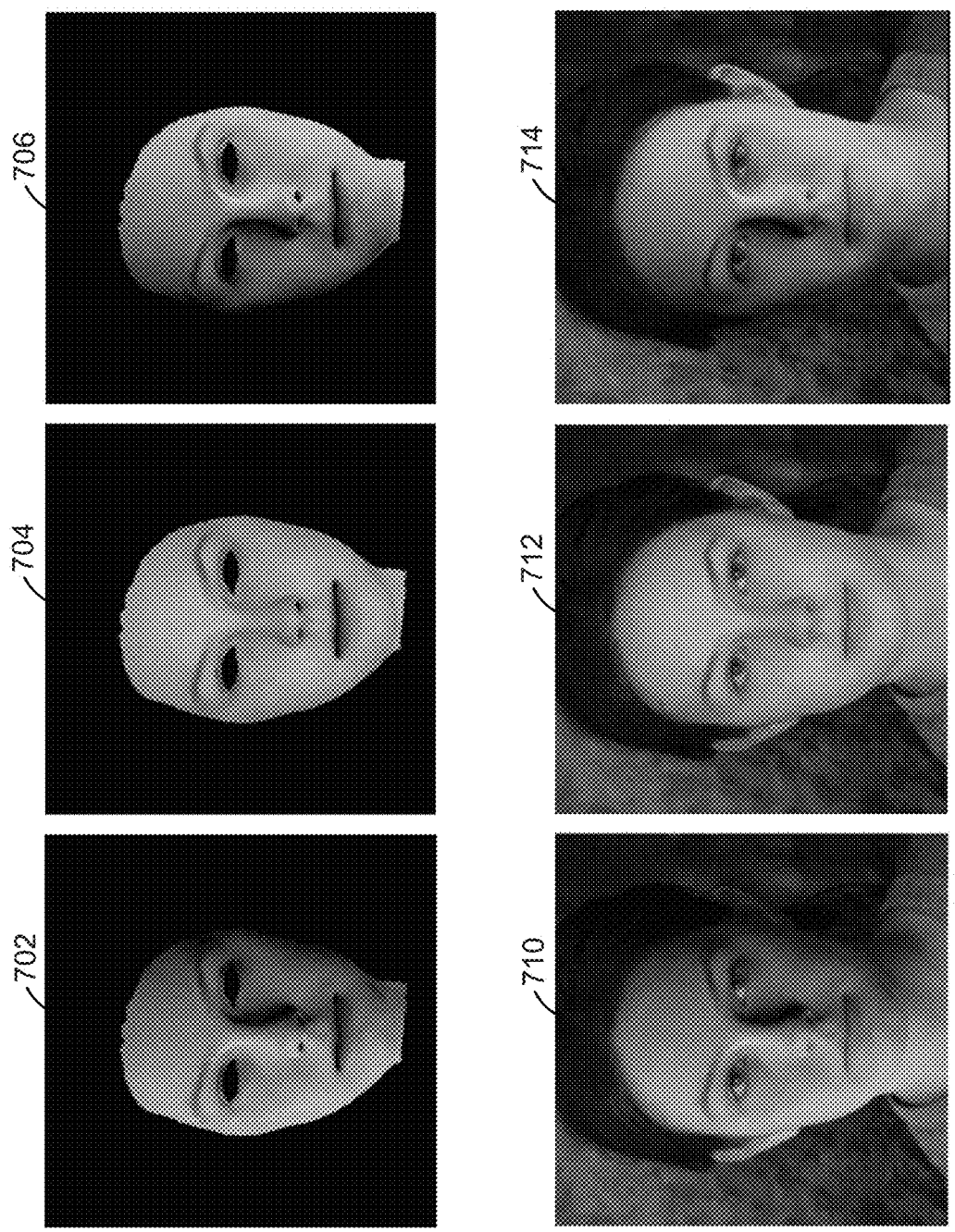
FIG. 7 illustrates exemplar head portrait images that include different lighting directions, according to various embodiments.

FIG. 7 illustrates exemplar head portrait images that include different lighting directions, according to various embodiments. As shown, images 702, 704, and 706 of the skin of a face have been rendered (by, e.g., rendering application 130) with different lighting directions. Given the rendered images 702, 704, and 706, the inpainting application 132 can generate corresponding composite images, shown as composite images 710, 712, and 714, in which missing non-skin regions of the rendered images 702, 704, and 706 are inpainted via neural projection, as described above in conjunction with FIGS. 2-3. As shown, the composite images 710, 712, and 714 include a consistent facial identity and realistic non-skin regions under different lighting directions.

Figure 8:
FIG. 8 illustrates exemplar head portrait images under different environment lighting, according to various embodiments.

FIG. 8 illustrates exemplar head portrait images under different environment lighting, according to various embodiments. As shown, images 802, 804, 806, 808, and 810 of the skin of a face have been rendered (by, e.g., rendering application 130) with different environment lighting, and additional background constraints are provided to guide the inpainting via neural projection. Given the rendered images 802, 804, 806, 808, and 810, the inpainting application 132 can generate corresponding composite images, shown as composite images 820, 822, 824, 826, and 828, in which missing non-skin regions of the rendered images 802, 804, 806, 808, and 810 are inpainted according to the neural projection techniques described above in conjunction with FIGS. 2-3. As shown, the neural projection techniques produce consistent results under different environment lighting, including extreme environment lighting conditions.

Figure 9:
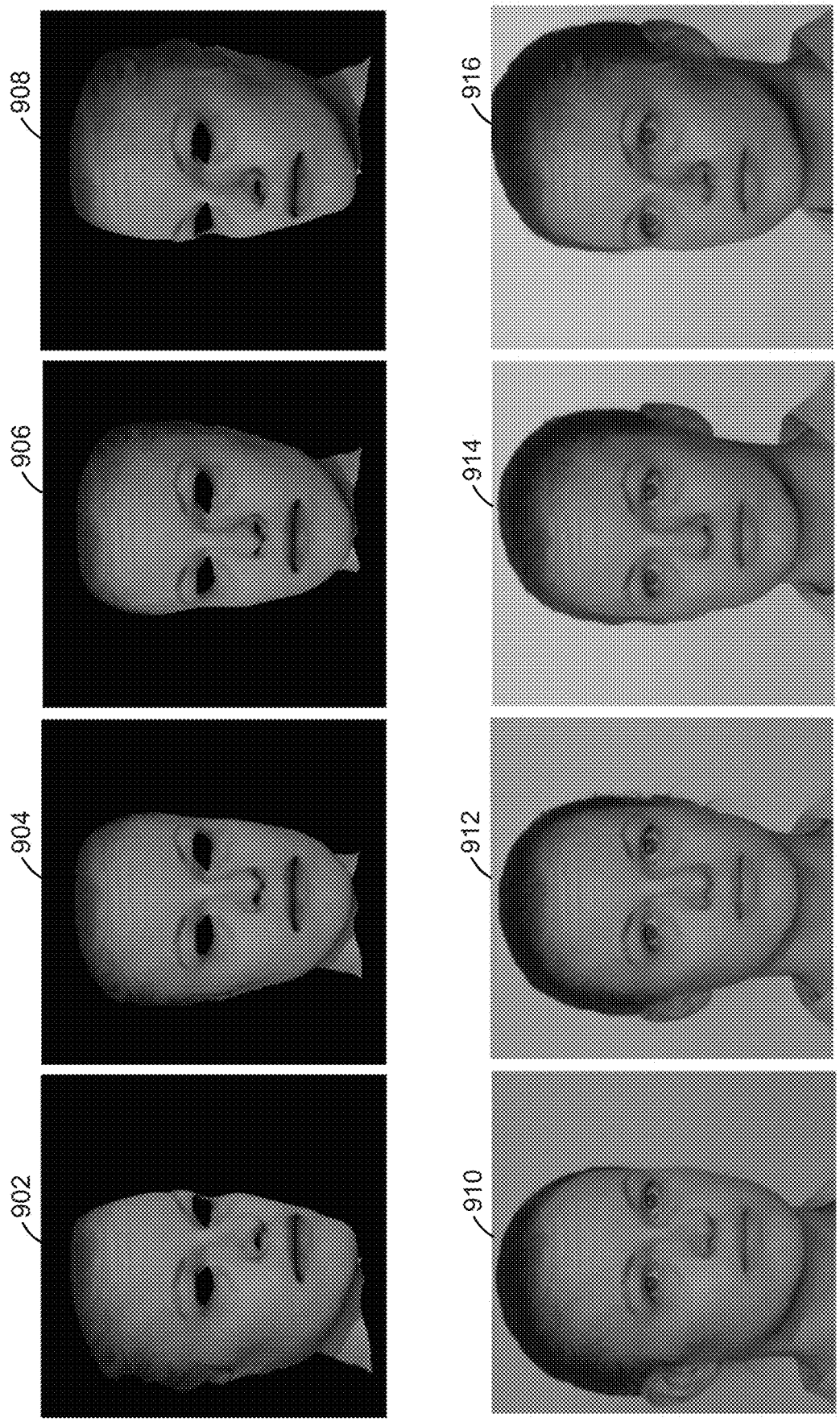
FIG. 9 illustrates exemplar head portrait images from different viewpoints, according to various embodiments.

FIG. 9 illustrates exemplar head portrait images from different viewpoints, according to various embodiments. As shown, images 902, 904, 906, and 908 of the skin of a face have been rendered (by, e.g., rendering application 130) from different viewpoints. Given the rendered images 902, 904, 906, and 908, the inpainting application 132 can generate corresponding composite images, shown as composite images 910, 912, 914, and 916, in which missing non-skin regions of the rendered images 902, 904, 906, and 908 are inpainted via neural projection, as described above in conjunction with FIGS. 2-3.

Figure 10:
FIG. 10 illustrates exemplar head portrait images that are generated by randomizing portions of a constrained optimization technique, according to various embodiments.

FIG. 10 illustrates exemplar head portrait images that are generated by randomizing portions of the constrained optimization technique described above in conjunction with FIGS. 2-3, according to various embodiments. As shown, images 1002, 1004, 1006, and 1008 have been rendered (by, e.g., rendering application 130) to include skin associated with different facial identities. Given the rendered images 1002, 1004, 1006, and 1008, the inpainting application 132 can generate corresponding composite images, shown as sets of composite images 1010, 1012, 1014, and 1016, in which missing non-skin regions of the rendered images 1002, 1004, 1006, and 1008 are inpainted via neural projection, as described above in conjunction with FIGS. 2-3. As shown, the inpainting application 132 can complete the rendered images 1002, 1004, 1006, and 1008 to generate photo-realistic head portrait images that match target skins of diverse facial identities and include different inpainted regions. In addition, a single rendered image (e.g., one of the rendered images 1002, 1004, 1006, or 1008) can be used to generate different variations of neural face completion by randomizing the neural projection. In some embodiments, the neural projection module 210 can randomize the sampling of latent basis vectors and/or randomize the seed weights that are used to initialize the optimization performed by the neural projection module 210, in order to generate projection images that satisfy the same optimization constraints but include different inpainted regions. Blending such projection images with the rendered images 1002, 1004, 1006, and 1008 can produce different composite images of head portraits, such as the sets of composite images 1010, 1012, 1014, and 1016.

As described above in conjunction with FIGS. 6-10, the neural projection techniques disclosed herein can generate photo-realistic head portrait images that match target skins of diverse facial identities and expressions and include different inpainted regions. The generated images can further include faces from different viewpoints, as well as different lighting directions and environment lighting. Accordingly, techniques disclosed herein can have a number of applications. For example, the disclosed techniques could be used to generate photorealistic head portrait images, including head portraits of captured or synthesized faces having desired expressions, viewpoints, and lighting conditions, that can be used in virtual scenes of film productions, video games, virtual avatars for telepresence, or in other computer graphics applications. As another example, the disclosed techniques could be used to generate a large set of head portrait images, such as a set of head portrait images that include different facial identities, expressions, viewpoints, and lighting conditions, for which corresponding information, such as the underlying geometry of the skin, associated appearance maps, viewpoint, and lighting are known. The set of head portrait images and corresponding information can then be used as a training data set to train a machine learning model. Any technically feasible machine learning can be trained, such as a facial performance capture, facial recognition, or landmark detection model.

Figure 11:
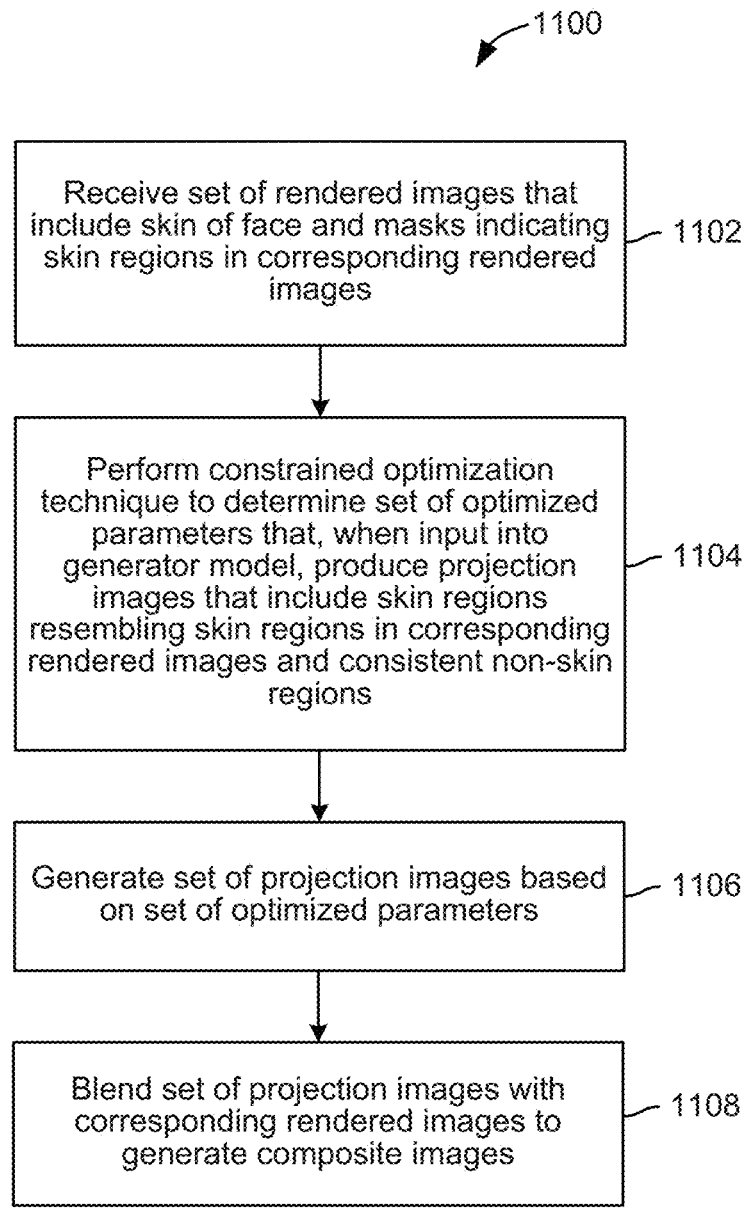
FIG. 11 is a flow diagram of method steps for generating head portrait images, according to various embodiments.

FIG. 11 is a flow diagram of method steps for generating head portrait images, according to various embodiments. Although the method steps are described with reference to the system of FIG. 1, persons skilled in the art will understand that any system configured to implement the method steps, in any order, falls within the scope of the present invention.

As shown, a method 1100 begins at step 1102, where the inpainting application 132 receives a set of rendered images that includes the skin of a face and masks that indicate skin regions in corresponding rendered images. As described, the rendered image can be generated in any technically feasible manner, such via ray tracing using known geometry of the skin and associated appearance maps, which can be obtained by capturing a human face using a facial capture technique or by generating a synthetic digital human using automated techniques and/or manually.

At step 1104, the inpainting application 132 performs a constrained optimization technique to determine a set of optimized parameters that, when input into a generator model such as StyleGAN2, produce projection images that include skin regions that resemble skin regions in the rendered images and consistent non-skin regions in each of the projection images that match each other in the case of a set of standalone images or that transition smoothly between consecutive frames in the case of frames of a video. In some embodiments, the constrained optimization technique includes optimizing the set of parameters subject to constraints that enforce parameter space consistency, image inpainting consistency, and consistency between the skin regions of the projection images and corresponding rendered images, as described above in conjunction with FIG. 3. Steps of a constrained optimization technique, according to some embodiments, are described below in conjunction with FIG. 12.

At step 1106, the inpainting application 132 generates a set of projection images based on the set of optimized parameters. As described, the set of projection images can be generated by inputting the set of optimized parameters into the generator model.

At step 1108, the inpainting application 132 blends the set of projection images with corresponding rendered images to generate composite images. In some embodiments, the inpainting application 132 performs an image space compositing technique in which each mask corresponding to a rendered image is blurred (e.g., via Gaussian blurring) and used as an alpha matte to blend that rendered image onto a corresponding projection image.

Figure 12:
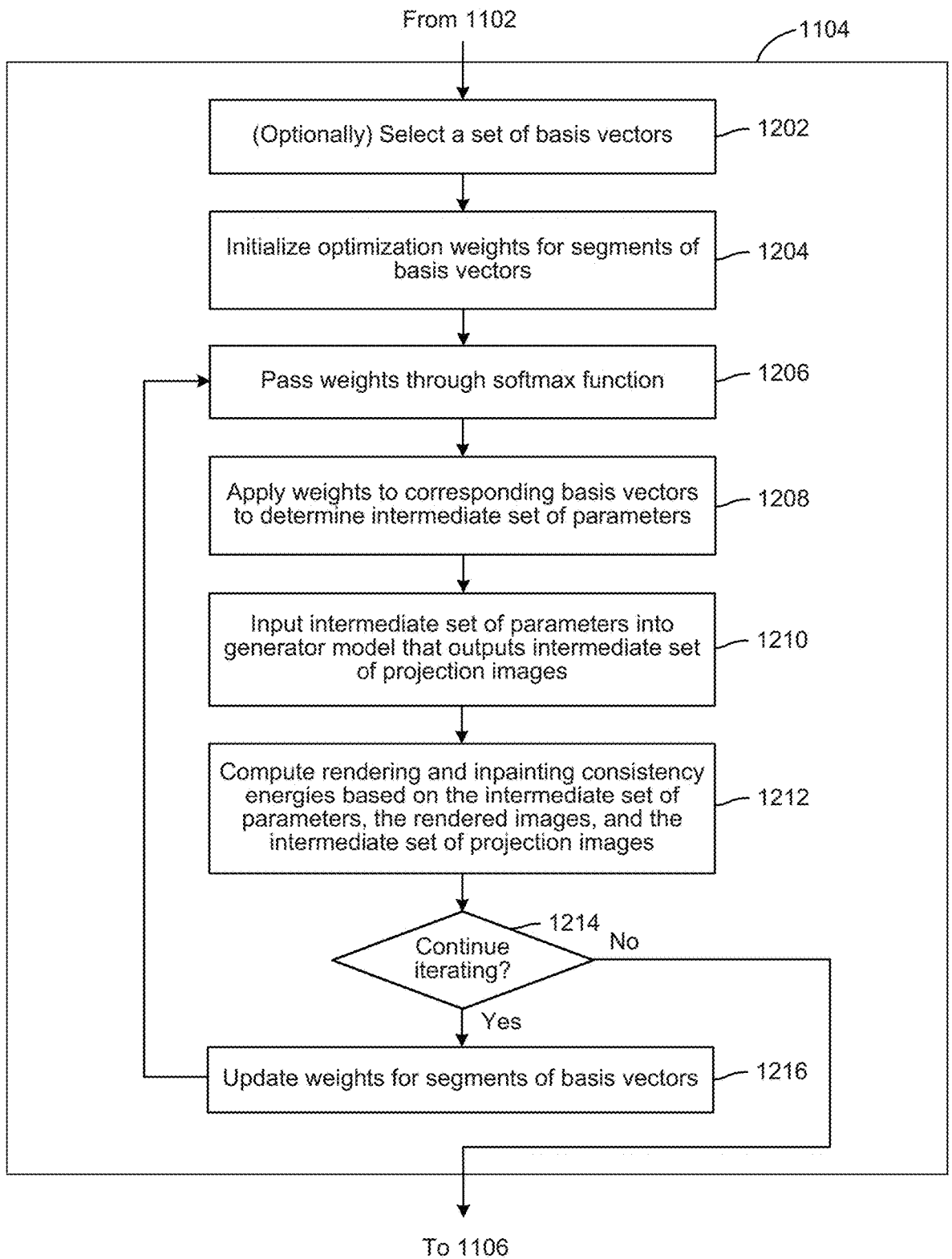
FIG. 12 is a flow diagram of method steps for performing a neural projection, according to various embodiments.

FIG. 12 is a flow diagram of method steps for performing the constrained optimization of step 1104, according to various embodiments. Although the method steps are described with reference to the system of FIG. 1, persons skilled in the art will understand that any system configured to implement the method steps, in any order, falls within the scope of the present invention.

As shown, at step 1202, the inpainting application 132 optionally selects a set of basis vectors. In some embodiments, a random set of basis vectors around an origin or mean of the latent space of a generator model is selected so that the optimization produces different results each time, as described above in conjunction with FIG. 10. In some other embodiments, the same basis vectors are used each time during the optimization, and step 1202 is not performed.

At step 1204, the inpainting application 132 initializes optimization weights for the segments of basis vectors. In some embodiments, the optimization weights can be initialized to random values.

At step 1206, the inpainting application 132 passes the weights through a softmax function. As described, passing the weights through the softmax function ensures that the blended segment of any given parameter is always within the convex hull of the basis segments.

At step 1208, the inpainting application 132 applies the weights to corresponding basis vectors to determine an intermediate set of parameters. In some embodiments, the weights can be applied to determine linear combinations of the basis vectors that are used as the intermediate set of parameters.

At step 1210, the inpainting application 132 inputs the intermediate set of parameters into a generator model, which outputs an intermediate set of projection images. In some embodiments, the generator model can be a pre-trained style-based neural network, such as StyleGAN or StyleGAN2.

At step 1212, the inpainting application 132 computes rendering and inpainting consistency energies based on the intermediate set of parameters, the rendered images, and the intermediate set of projection images. In some embodiments, the inpainting application 132 computes the rendering and inpainting consistency energies according to equations (4)-(8), described above in conjunction with FIG. 3.

At step 1214, the inpainting application 132 determines whether to continue iterating. In some embodiments, the inpainting application 132 stops iterating if a local minimum of a combination of rendering and inpainting consistency energies is reached, indicating that the set of parameters has been optimized, or a maximum number of iterations have been performed. Otherwise, the inpainting application 132 continues iterating.

If the inpainting application 132 determines to continue iterating, then at step 1216, the inpainting application 132 updates the weights for the segments of basis vectors. In some embodiments, the inpainting application 132 updates the weights based on the rendering and inpainting consistency energies computed at step 1212 and an iterative optimization technique, such as the gradient descent technique or a variant thereof. The inpainting application 132 then returns to step 1106, where the inpainting application 132 passes the updated weights through the softmax function.

On the other hand, if the inpainting application 132 determines to stop iterating at step 1214, then continuing to step 1106, the inpainting application 132 generates the set of projection images based on the set of optimized parameters.

In sum, techniques are disclosed for generating photorealistic images of head portraits. In some embodiments, a rendering application renders a set of images that include the skin of a face and corresponding masks indicating pixels associated with the skin in the images. Given the rendered images and the masks, an inpainting application performs a neural projection technique to optimize a set of parameters that, when input into a generator model, produces a set of projection images, each of which includes a head portrait in which (1) skin regions resemble the skin regions of the face in a corresponding rendered image; and (2) non-skin regions match the non-skin regions in the other projection images in the case where the rendered set of images are standalone images, or non-skin regions transition smoothly between consecutive projection images in the case where the rendered set of images are frames of a video. The rendered images can then be blended with corresponding projection images to generate composite images that are photorealistic.

One technical advantage of the disclosed techniques relative to the prior art is the disclosed techniques can generate multiple images of head portraits, such as the frames of a video, in which rendered skin attributes of the head portraits are controlled as in traditional animation, while inpainted attributes are consistent and do not change significantly across consecutive images. Further, the disclosed techniques can be used to generate photorealistic head portrait images that include skin regions with high-quality details of captured faces, or synthetically generated faces, as well as plausible non-skin regions, without requiring significant manual intervention. The generated images can be used in various applications, such as in virtual scenes of film productions, in video games, virtual avatars for telepresence, and to train machine learning models. These technical advantages represent one or more technological advancements over prior art approaches.

Any and all combinations of any of the claim elements recited in any of the claims and/or any elements described in this application, in any fashion, fall within the contemplated scope of the present invention and protection.

1. In some embodiments, a computer-implemented method for rendering a head portrait comprises rendering a first set of images, wherein each image included in the first set of images comprises one or more skin regions associated with a face, determining a set of parameters based on one or more optimization operations, the first set of images, and a machine learning model, generating a second set of images based on the set of parameters and the machine learning model, wherein each image included in the second set of images comprises one or more skin regions associated with the face and one or more non-skin regions, and blending each image included in the first set of images with a corresponding image included in the second set of images.

2. The method of clause 1, wherein determining the set of parameters comprises applying a plurality of weights to a plurality of basis vectors to determine an intermediate set of parameters, generating an intermediate set of images based on the intermediate set of parameters and the machine learning model, computing a rendering energy based on the intermediate set of parameters, the first set of images, and the intermediate set of images, computing an inpainting consistency energy based on the intermediate set of images, and updating the plurality of weights based on the rendering energy and the inpainting consistency energy.

3. The method of clauses 1 or 2, wherein each weight included in the plurality of weights is associated with a corresponding segment of a basis vector included in the plurality of basis vectors.

4. The method of any of clauses 1-3, wherein the rendering energy comprises a segmentation loss that penalizes misalignments between one or more portions of the one or more skin regions in the first set of images and corresponding one or more portions of one or more skin regions in the intermediate set of images.

5. The method of any of clauses 1-4, wherein the inpainting consistency energy penalizes variations of one or more non-skin regions of the intermediate set of images from an average of the one or more non-skin regions of the intermediate set of images.

6. The method of any of clauses 1-5, wherein the inpainting consistency energy penalizes differences between temporal neighbors in an ordering of the intermediate set of images.

7. The method of any of clauses 1-6, further comprising selecting the plurality of basis vectors from a set of basis vectors.

8. The method of any of clauses 1-7, further comprising sampling within a region around an origin of a latent space of the machine learning model to determine the plurality of basis vectors.

9. The method of any of clauses 1-8, wherein each image included in the first set of images is blended with the corresponding image included in the second set of images based on a blurring of a corresponding mask that indicates one or more skin regions in the image included in the first set of images.

10. The method of any of clauses 1-9, wherein the first set of images is rendered based on (i) geometry of the face that is at least one of captured, automatically generated, or manually created, and (ii) one or more associated appearance maps.

11. In some embodiments, one or more non-transitory computer-readable storage media include instructions that, when executed by at least one processor, cause the at least one processor to performing steps for rendering a head portrait, the steps comprising rendering a first set of images, wherein each image included in the first set of images comprises one or more skin regions associated with a face, determining a set of parameters based on one or more optimization operations, the first set of images, and a machine learning model, generating a second set of images based on the set of parameters and the machine learning model, wherein each image included in the second set of images comprises one or more skin regions associated with the face and one or more non-skin regions, and blending each image included in the first set of images with a corresponding image included in the second set of images.

12. The one or more non-transitory computer-readable storage media of clause 11, wherein determining the set of parameters comprises applying a plurality of weights to a plurality of basis vectors to determine an intermediate set of parameters, generating an intermediate set of images based on the intermediate set of parameters and the machine learning model, computing a rendering energy based on the intermediate set of parameters, the first set of images, and the intermediate set of images, computing an inpainting consistency energy based on the intermediate set of images, and updating the plurality of weights based on the rendering energy and the inpainting consistency energy.

13. The one or more non-transitory computer-readable storage media of clauses 11 or 12, wherein each weight included in the plurality of weights is associated with a corresponding segment of a basis vector included in the plurality of basis vectors.

14. The one or more non-transitory computer-readable storage media of any of clauses 11-13, wherein the rendering energy comprises a segmentation loss that penalizes misalignments between one or more portions of the one or more skin regions in the first set of images and corresponding one or more portions of one or more skin regions in the intermediate set of images.

15. The one or more non-transitory computer-readable storage media of any of clauses 11-14, wherein the inpainting consistency energy penalizes at least one of (i) variations of one or more non-skin regions of the intermediate set of images from an average of the one or more non-skin regions of the intermediate set of images, or (ii) differences between temporal neighbors in an ordering of the intermediate set of images.

16. The one or more non-transitory computer-readable storage media of any of clauses 11-15, wherein the second set of images is further generated based on a set of masks, each mask included in the set of masks indicating one or more skin regions in a corresponding image included in the first set of images.

17. The one or more non-transitory computer-readable storage media of any of clauses 11-16, wherein the machine learning model comprises a style-based neural network.

18. The one or more non-transitory computer-readable storage media of any of clauses 11-17, wherein each image included in the first set of images is blended with the corresponding image included in the second set of images based on a blurring of a corresponding mask that indicates one or more skin regions in the image included in the first set of images.

19. The one or more non-transitory computer-readable storage media of any of clauses 11-18, wherein the first set of images is rendered based on (i) geometry of the face that is at least one of captured, automatically generated, or manually created, and (ii) one or more associated appearance maps.

20. In some embodiments, a system comprises one or more memories storing instructions, and one or more processors that are coupled to the one or more memories and, when executing the instructions, are configured to render a first set of images, wherein each image included in the first set of images comprises one or more skin regions associated with a face, determine a set of parameters based on one or more optimization operations, the first set of images, and a machine learning model, generate a second set of images based on the set of parameters, and the machine learning model, wherein each image included in the second set of images comprises one or more skin regions associated with the face and one or more non-skin regions, and blend each image included in the first set of images with a corresponding image included in the second set of images.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s), It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for rendering a head portrait, the method comprising:
   rendering a first set of images, wherein each image included in the first set of images comprises one or more skin regions of a face in each image and excludes non-skin regions of the face in each image, the non-skin regions of the face including background pixels associated with non-facial content;
   determining a set of parameters based on one or more optimization operations, the first set of images, and a machine learning model;
   generating a second set of images based on the set of parameters and the machine learning model, wherein each image included in the second set of images comprises one or more skin regions associated with the face and one or more non-skin regions, wherein the set of parameters constrain the one or more skin regions of each image included in the second set of images to resemble one or more skin regions of a corresponding image included in the first set of images, and wherein the set of parameters constrain the one or more non-skin regions of each image included in the second set of images to correspond to non-skin regions of other images included in the second set of images; and blending each image included in the first set of images with a corresponding image included in the second set of images.

2. The method of claim 1, wherein determining the set of parameters comprises:

applying a plurality of weights to a plurality of basis vectors to determine an intermediate set of parameters;

generating an intermediate set of images based on the intermediate set of parameters and the machine learning model;

computing a rendering energy based on the intermediate set of parameters, the first set of images, and the intermediate set of images;

computing an inpainting consistency energy based on the intermediate set of images; and updating the plurality of weights based on the rendering energy and the inpainting consistency energy.

3. The method of claim 2, wherein each weight included in the plurality of weights is associated with a corresponding segment of a basis vector included in the plurality of basis vectors.

4. The method of claim 2, wherein the rendering energy comprises a segmentation loss that penalizes misalignments between one or more portions of the one or more skin regions in the first set of images and corresponding one or more portions of one or more skin regions in the intermediate set of images.

5. The method of claim 2, wherein the inpainting consistency energy penalizes variations of one or more non-skin regions of the intermediate set of images from an average of the one or more non-skin regions of the intermediate set of images.

6. The method of claim 2, wherein the inpainting consistency energy penalizes differences between temporal neighbors in an ordering of the intermediate set of images.

7. The method of claim 2, further comprising selecting the plurality of basis vectors from a set of basis vectors.

8. The method of claim 2, further comprising sampling within a region around an origin of a latent space of the machine learning model to determine the plurality of basis vectors.

9. The method of claim 1, wherein each image included in the first set of images is blended with the corresponding image included in the second set of images based on a blurring of a corresponding mask that indicates one or more skin regions in the image included in the first set of images.

10. The method of claim 1, wherein the first set of images is rendered based on (i) geometry of the face that is at least one of captured, automatically generated, or manually created; and (ii) one or more associated appearance maps.

11. One or more non-transitory computer-readable storage media including instructions that, when executed by at least one processor, cause the at least one processor to performing steps for rendering a head portrait, the steps comprising:

rendering a first set of images, wherein each image included in the first set of images comprises one or more skin regions of a face in each image and excludes non-skin regions of the face in each image, the non-skin regions of the face including background pixels associated with non-facial content;

determining a set of parameters based on one or more optimization operations, the first set of images, and a machine learning model;

generating a second set of images based on the set of parameters and the machine learning model, wherein each image included in the second set of images comprises one or more skin regions associated with the face and one or more non-skin regions, wherein the set of parameters constrain the one or more skin regions of each image included in the second set of images to resemble one or more skin regions of a corresponding image included in the first set of images, and wherein the set of parameters constrain the one or more non-skin regions of each image included in the second set of images to correspond to non-skin regions of other images included in the second set of images; and blending each image included in the first set of images with a corresponding image included in the second set of images.

12. The one or more non-transitory computer-readable storage media of claim 11, wherein determining the set of parameters comprises:

applying a plurality of weights to a plurality of basis vectors to determine an intermediate set of parameters;

generating an intermediate set of images based on the intermediate set of parameters and the machine learning model;

computing a rendering energy based on the intermediate set of parameters, the first set of images, and the intermediate set of images;

computing an inpainting consistency energy based on the intermediate set of images; and updating the plurality of weights based on the rendering energy and the inpainting consistency energy.

13. The one or more non-transitory computer-readable storage media of claim 12, wherein each weight included in the plurality of weights is associated with a corresponding segment of a basis vector included in the plurality of basis vectors.

14. The one or more non-transitory computer-readable storage media of claim 12, wherein the rendering energy comprises a segmentation loss that penalizes misalignments between one or more portions of the one or more skin regions in the first set of images and corresponding one or more portions of one or more skin regions in the intermediate set of images.

15. The one or more non-transitory computer-readable storage media of claim 12, wherein the inpainting consistency energy penalizes at least one of (i) variations of one or more non-skin regions of the intermediate set of images from an average of the one or more non-skin regions of the intermediate set of images, or (ii) differences between temporal neighbors in an ordering of the intermediate set of images.

16. The one or more non-transitory computer-readable storage media of claim 12, wherein the second set of images is further generated based on a set of masks, each mask included in the set of masks indicating one or more skin regions in a corresponding image included in the first set of images.

17. The one or more non-transitory computer-readable storage media of claim 12, wherein the machine learning model comprises a style-based neural network.

18. The one or more non-transitory computer-readable storage media of claim 11, wherein each image included in the first set of images is blended with the corresponding image included in the second set of images based on a blurring of a corresponding mask that indicates one or more skin regions in the image included in the first set of images.

19. The one or more non-transitory computer-readable storage media of claim 11, wherein the first set of images is rendered based on (i) geometry of the face that is at least one of captured, automatically generated, or manually created; and (ii) one or more associated appearance maps.

20. A system comprising:
one or more memories storing instructions; and
one or more processors that are coupled to the one or more memories and, when executing the instructions, are configured to:
render a first set of images, wherein each image included in the first set of images comprises one or more skin regions of a face in each image and excludes non-skin regions of the face in each image, the non-skin regions of the face including background pixels associated with non-facial content,
determine a set of parameters based on one or more optimization operations, the first set of images, and a machine learning model,
generate a second set of images based on the set of parameters, and the machine learning model, wherein each image included in the second set of images comprises one or more skin regions associated with the face and one or more non-skin regions, wherein the set of parameters constrain the one or more skin regions of each image included in the second set of images to resemble one or more skin regions of a corresponding image included in the first set of images, and wherein the set of parameters constrain the one or more non-skin regions of each image included in the second set of images to correspond to non-skin regions of other images included in the second set of images, and
blend each image included in the first set of images with a corresponding image included in the second set of images.

* * * * *